United States Patent
Ito

(10) Patent No.: US 10,142,546 B2
(45) Date of Patent: Nov. 27, 2018

(54) SHAKE-CORRECTION DEVICE AND SHAKE-CORRECTION METHOD FOR PHOTOGRAPHING APPARATUS

(71) Applicant: RICOH IMAGING COMPANY, LTD., Tokyo (JP)

(72) Inventor: Eiichi Ito, Chiba (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/434,461

(22) Filed: Feb. 16, 2017

(65) Prior Publication Data

US 2017/0272657 A1 Sep. 21, 2017

(30) Foreign Application Priority Data

Mar. 16, 2016 (JP) ................................. 2016-052360
Feb. 14, 2017 (JP) ................................. 2017-024753

(51) Int. Cl.
- *H04N 5/228* (2006.01)
- *H04N 5/232* (2006.01)
- *G03B 5/00* (2006.01)

(52) U.S. Cl.
CPC .......... *H04N 5/23287* (2013.01); *G03B 5/00* (2013.01); *H04N 5/23212* (2013.01);
(Continued)

(58) Field of Classification Search
CPC .......... H04N 5/23248; H04N 5/23251; H04N 5/23258; H04N 5/23264; H04N 5/2328; H04N 5/23287
(Continued)

(56) References Cited

U.S. PATENT DOCUMENTS 5,157,563 A 10/1992 Eiji Yokoyama et al.
8,159,594 B2 * 4/2012 Nitta ................... H04M 1/0214
348/208.99
(Continued)

FOREIGN PATENT DOCUMENTS

JP S59-011071 A 1/1984
JP H02-154313 A 6/1990
(Continued)

OTHER PUBLICATIONS

U.S. Appl. No. 15/361,190 to Eiichi Ito et al., filed Nov. 25, 2016.
(Continued)

*Primary Examiner* — Anthony J Daniels
(74) *Attorney, Agent, or Firm* — Greenblum & Bernstein, P.L.C.

(57) ABSTRACT

A shake-correction device for a photographing apparatus, which photographs an object image projected onto an imaging surface, includes a mover provided with a movable member, the mover configured to rotate at least one of the object image and the imaging surface relative to a plane orthogonal to the optical axis, and to translate parallel to the plane that is orthogonal to the optical axis and translate in a translation direction parallel to the optical axis; a shake detector configured to detect an angular shake of the photographing apparatus in the rotational direction and detect a shift shake of the photographing apparatus in the translation directions; and a movement controller configured to control movement of the mover so that the object image does not relatively move with respect to the imaging surface when the shake detector detects at least one of the angular shake and the shift shake.

9 Claims, 18 Drawing Sheets

(52) U.S. Cl.
CPC . *H04N 5/23258* (2013.01); *G03B 2205/0007* (2013.01); *G03B 2217/005* (2013.01)

(58) Field of Classification Search
USPC ....... 348/208.99, 208.2, 208.4, 208.6, 208.7, 348/208.11, 208.12
See application file for complete search history.

(56) References Cited

U.S. PATENT DOCUMENTS

| | | | |
|---|---|---|---|
| 9,658,429 B2* | 5/2017 | Ito | G02B 7/38 |
| 2006/0082674 A1* | 4/2006 | Noji | G02B 27/646 |
| | | | 348/360 |
| 2012/0200673 A1* | 8/2012 | Tagawa | G02B 7/365 |
| | | | 348/46 |
| 2012/0268642 A1 | 10/2012 | Kawai | |
| 2012/0293674 A1* | 11/2012 | Uenaka | H04N 5/23258 |
| | | | 348/208.99 |
| 2013/0194442 A1 | 8/2013 | Yazawa | |
| 2014/0036101 A1* | 2/2014 | Imanishi | H04N 5/23258 |
| | | | 348/208.5 |
| 2014/0146191 A1* | 5/2014 | Tsuchiya | G02B 27/646 |
| | | | 348/208.2 |
| 2017/0064201 A1* | 3/2017 | Tsuchiya | H04N 5/23229 |

FOREIGN PATENT DOCUMENTS

| | | |
|---|---|---|
| JP | H08-265612 A | 10/1996 |
| JP | 2008-035308 A | 2/2008 |
| JP | 2012-226205 A | 11/2012 |
| JP | 2013-160806 A | 8/2013 |

OTHER PUBLICATIONS

U.S. Appl. No. 15/362,059 to Eiichi Ito, filed Nov. 28, 2016.
U.S. Appl. No. 15/435,352 to Eiichi Ito, filed Feb. 17, 2017.
U.S. Appl. No. 15/434,483 to Eiichi Ito, filed Feb. 16, 2017.

* cited by examiner

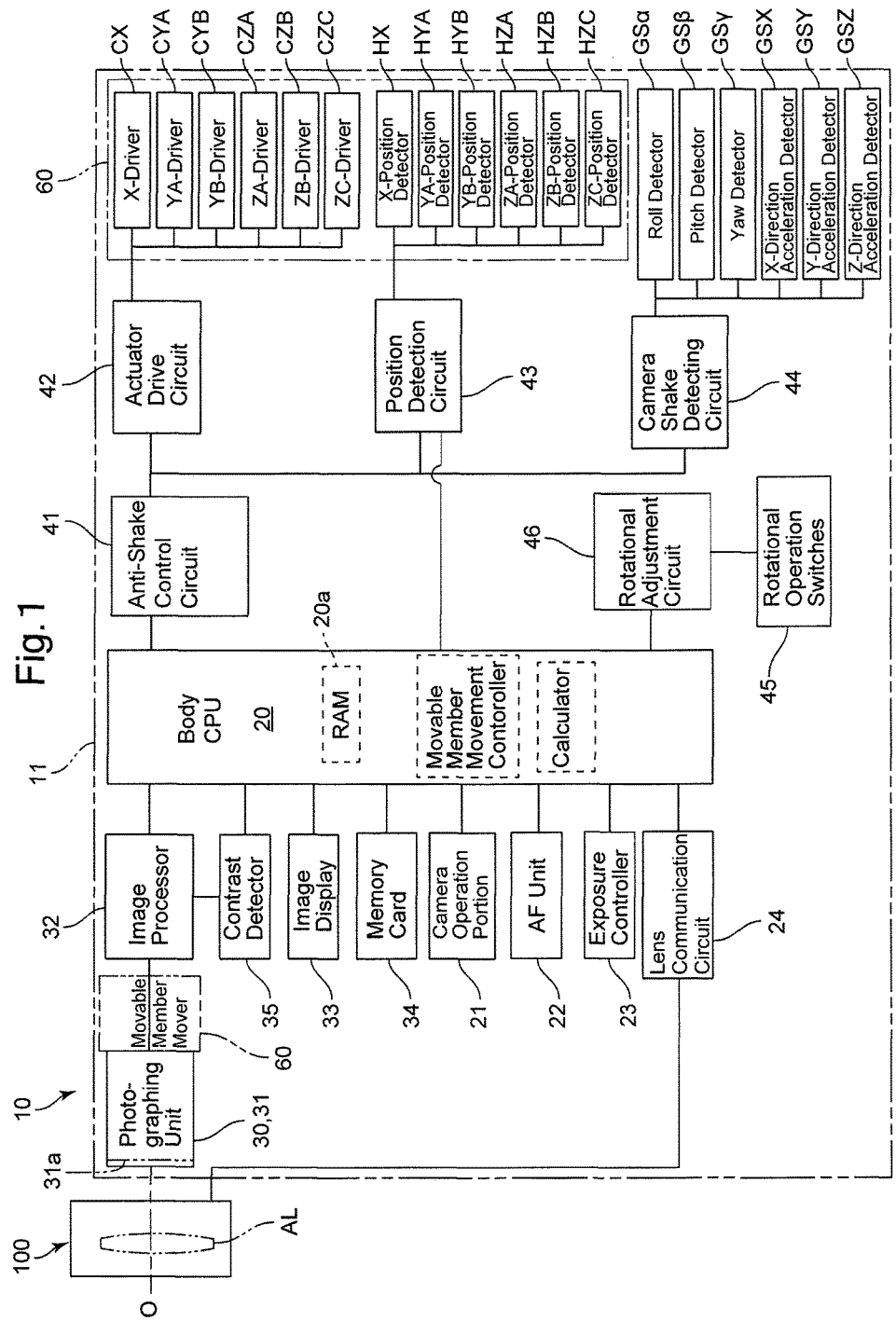

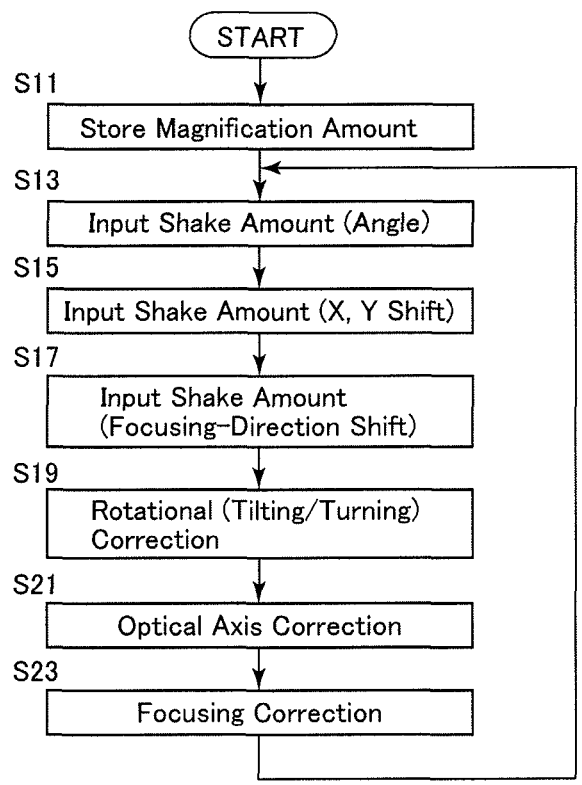

Optical Axis Correction

Shift Hand Shake Amount Δb
(Focusing direction)

SHAKE-CORRECTION DEVICE AND SHAKE-CORRECTION METHOD FOR PHOTOGRAPHING APPARATUS

BACKGROUND OF THE INVENTION

1. Field of the Invention

The present invention relates to a shake-correction device and a shake-correction method that are suitable for a photographing apparatus of a camera (or an image projector apparatus such as a projector), etc.

2. Description of the Related Art

In the related art, a method of using voice coil motors that use thin oblong-shaped drive coils is known in the art to be applied to a hand-shake correction device for correcting hand shake that occurs in an SLR (Single Lens Reflex) camera (Patent Literature 1). Furthermore, a hand-shake correction device is also known in the art in which hand-shake correction is possible in a total of six degrees of freedom (6DoF) by tilting an image sensor about two rotational axes, which are mutually orthogonal to each other in a plane that is orthogonal to an optical axis of a photographing lens; by rotating a reflection member that is provided at a midway position in a photographing optical system for folding (bending) an optical path about an axis that is parallel to the optical axis and tilting the reflection member about an axis that is orthogonal to the optical axis; and also by moving a lens group that is positioned midway within the photographing optical system in the optical axis direction (Patent Literature 2).

[Patent Literature 1] Japanese Unexamined Patent Publication No. 2012-226205

[Patent Literature 2] Japanese Unexamined Patent Publication No. 2008-035308

However, in the hand-shake correction device of Patent Literature 1, the hand-shake correction drive thereof can only be carried out in a plane that is orthogonal to the optical axis of the photographing optical system, so that there is limited freedom in the hand-shake correction thereof. The hand-shake correction device of the related art could not, for example, carryout a shake correction by tilting/rotating and panning the image sensor. Furthermore, if hand-shaking occurred so that the entire camera shook in the optical axis direction, a focal shift (out-of-focus state) occurs, and this focal shift could not be corrected.

In the hand-shake correction device of Patent Literature 2, since there are three members that are driven (controlled), namely, the image sensor, the lens group and a prism (the reflection member), the structure and control therefor is complicated, so that high-precision hand-shake correction is difficult.

SUMMARY OF THE INVENTION

The present invention has been devised in view of the above described problems, and the present invention provides a shake-correction device and a shake-correction method that are suitable for a photographing apparatus (or an image projector apparatus such as a projector) in which image-shake, focal shift and compositional changes do not easily occur even if shaking (due to hand shake, vibrations, etc.) occurs.

According to an aspect of the present invention, a shake-correction device for a photographing apparatus is provided, the photographing apparatus configured to photograph an object image that is projected onto an imaging surface by a photographing optical system, the shake-correction device including a mover provided with a movable member, the mover configured to rotate at least one of the object image and the imaging surface in a rotational direction relative to a plane that is orthogonal to an optical axis of the photographing optical system, and configured to translate in a translation direction parallel to the plane that is orthogonal to the optical axis and translate in a translation direction parallel to the optical axis; a shake detector configured to detect an angular shake of the photographing apparatus in the rotational direction and detect a shift shake of the photographing apparatus in the translation directions; and a movement controller configured to control movement of the mover so that the object image does not relatively move with respect to the imaging surface when the shake detector detects at least one of the angular shake and the shift shake.

It is desirable for the shake-correction device for a photographing apparatus to further include a calculator configured to calculate a rotational correction amount, in accordance with the angular shake, and a shift correction amount, in accordance with the shift shake, for moving the mover so that the object image that is projected onto the image surface does not relatively move with respect to the imaging surface.

It is desirable for the movable member to include an image sensor configured to capture an image of the object image that is projected onto the imaging surface. The mover is configured to at least one of: rotate the image sensor in a rotational direction relative to a plane that is orthogonal to an optical axis of the photographing optical system, translate the image sensor in a translation direction parallel to the plane that is orthogonal to the optical axis, and translate the image sensor in a translation direction parallel to the optical axis.

It is desirable for the movable member to include an optical element of the photographing optical system. The mover is configured to move the optical element so that the object image at least one of: rotates in a rotational direction relative to a plane that is orthogonal to an optical axis of the photographing optical system, translates in a translation direction parallel to the plane that is orthogonal to the optical axis, and translates in a translation direction parallel to the optical axis.

When the shake detector detects angular shake, it is desirable for the calculator to calculate a focusing shift amount, caused by the angular shake, and calculate a focusing correction amount in accordance with the focusing shift amount. The movement controller controls the mover to translate the movable member in a focusing direction based on the focusing correction amount.

When the shake detector detects shift shake in a direction orthogonal to the optical axis, it is desirable for the calculator to calculate a shift amount in the direction orthogonal to the optical axis, caused by shift shake, and to calculate an optical-axis direction movement amount and a rotational amount of an image sensor in accordance with the shift shake. The movement controller controls the mover to translate the movable member in the optical axis direction based on the optical-axis direction movement amount, and to rotate the movable member about a direction that is orthogonal to the optical axis based on the rotational amount.

When the shake detector detects shift in the optical axis direction, it is desirable for the calculator to calculate a shift amount in a focusing direction along the optical axis, and to calculate a focusing correction amount in accordance with the shift amount. The movement controller controls the mover to translate the movable member in the focusing direction based on the focusing correction amount.

When the shake detector detects an angular shake whereby the optical axis of the photographing optical system rotates relative to an initial position, it is desirable for the calculator to calculate an image-surface tilt correction amount using the following formula:

$$\Delta\theta \times m,$$

wherein $\Delta\theta$ designates the amount of the angular shake, m designates an optical magnification of the photographing optical system, m=a/b, "a" designates a distance between a principal plane of the photographing optical system and the imaging surface, and "b" designates a distance between a principal plane of the photographing optical system and an object surface. The calculator calculates an optical-axis correction amount using the following formula:

$$a \times \tan \Delta\theta.$$

The movement controller controls the mover to rotate the image sensor based on the calculated the image-surface tilt correction amount and controls the mover to translate the image sensor in a direction orthogonal to the optical axis based on the calculated the optical-axis correction amount, thereby correcting the angular shake.

It is desirable for the calculator to calculate an optical magnification of the photographing optical system based on the following formula:

$$m = a/b,$$

wherein m designates the optical magnification of the photographing optical system, "a" designates a distance between a principal plane of the photographing optical system and the imaging surface, and "b" designates a distance between a principal plane of the photographing optical system and an object surface. The calculate calculates at least one of the rotational correction amount and the shift correction amount based on the optical magnification.

In an embodiment, a shake-correction method for a shake-correction device of a photographing apparatus is provided, the photographing apparatus configured to photograph an object image that is projected onto an imaging surface by the photographing optical system, and the shake-correction device including a mover provided with a movable member, the mover configured to rotate at least one of the object image and the imaging surface in a rotational direction relative to a plane that is orthogonal to an optical axis of the photographing optical system and configured to translate in a translation direction parallel to the plane that is orthogonal to the optical axis and translate in a translation direction parallel to the optical axis; a shake detector; and a movement controller configured to control movement of the mover. The shake-correction method includes detecting, using the shake detector, an angular shake of the photographing apparatus in the rotational direction and detecting a shift shake of the photographing apparatus in the translation directions; and controlling movement of the mover so that the object image does not relatively move with respect to the imaging surface based on at least one of the angular shake and the shift shake that is detected by the shake detector.

In an embodiment, a shake-correction device for an image projector apparatus is provided, the image projector apparatus including an image-forming element and a projector optical system that is configured to project an image formed by the image-forming element, the shake-correction device including a mover provided with a movable member, the mover configured to rotate at least one of the image-forming element and the projector optical system in a rotational direction relative to a plane that is orthogonal to an optical axis of the projector optical system, and configured to translate in a translation direction parallel to the plane that is orthogonal to the optical axis and translate in a translation direction parallel to the optical axis; a shake detector configured to detect an angular shake of the image projector apparatus in the rotational direction and detect a shift shake of the image projector apparatus in the translation directions; and a movement controller configured to control movement of the mover so that the projected image does not relatively move with respect to a projection surface when the shake detector detects at least one of the angular shake and the shift shake.

According to the shake-correction device and the shake-correction method for the photographing apparatus and image projector apparatus of the present invention, even if rotational (tilting or turning) shake or shift-shake of the photographing apparatus and image projector apparatus occurs in any direction, focal shift and adverse influence on the photographing image or projector image can be reduced as much as possible regardless of the attitude of the movable member.

The present disclosure relates to subject matter contained in Japanese Patent Application No. 2016-052360 (filed on Mar. 16, 2016) and Japanese Patent Application No. 2017-024753 (filed on Feb. 14, 2017) which are expressly incorporated herein by reference in their entireties.

BRIEF DESCRIPTION OF THE DRAWINGS

The present invention will be described below in detail with reference to the accompanying drawings in which:

FIG. 1 is a block diagram illustrating main components of a digital camera which incorporates a stage apparatus, to which a shake-correction device according to the present invention is applied;

FIG. 6 is a flowchart of a shake correction operation of a shake-correction device of a photographing apparatus according to a first embodiment of the present invention;

DESCRIPTION OF THE EMBODIMENTS

Figure 2A:
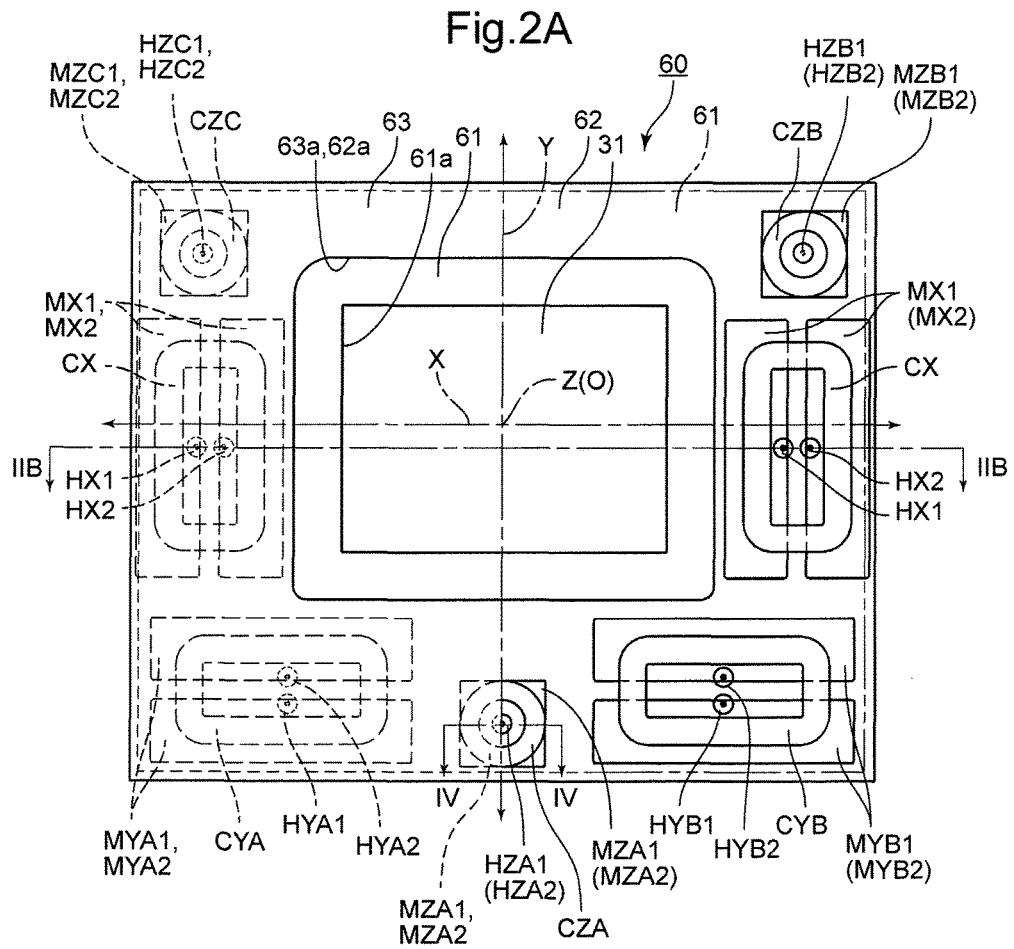
FIG. 2A is a rear elevational view of an embodiment of the stage apparatus with six degrees of freedom according to the present invention, wherein a rear yoke and a movable stage are not shown in a right half of FIG. 2A.

Embodiments of the present invention will be hereinafter discussed with reference to FIGS. 1 through 19. FIG. 1 is a conceptual block diagram of main components and main circuit elements of a digital camera, to which the present invention is applied. In the diagram of FIG. 1, the direction parallel to a photographing optical axis O (which includes the concept of the direction aligned with the photographing optical axis O) is defined as the first direction (Z-direction/Z-axis), a direction orthogonal to the first direction is defined as the second direction (X-direction/X-axis direction), and a direction orthogonal to both the first direction (Z-direction) and the second direction (X-direction) is defined as the third direction (Y-direction/Y-axis direction). When the photographing optical axis O is defined as the Z-axis, two axes orthogonal to the Z-axis are regarded as the X-axis and the Y-axis. When the camera is in a normal position (horizontal position), the first direction (Z-direction/Z-axis) and the second direction (X-direction/X-axis) are defined as horizontal directions and the third direction (Y-direction/Y-axis) is defined as a vertical direction, and the object side and the direction toward the object defines a front side (of the imaging apparatus) and the forward direction, respectively. Furthermore, in the present disclosure, rotation about the Z-direction (first direction) refers to rotation about an imaginary axis that is parallel to the Z-axis. Similarly, rotation about the X-direction (second direction) refers to rotation about an imaginary axis that is parallel to the X-axis, and rotation about the Y-direction (third direction) refers to rotation about an imaginary axis that is parallel to the y-axis. Additionally, in the present specification, turning (rotation) about an imaginary axis in the first direction denotes turning with an imaginary axis parallel to (extending in) the first direction as a rotational center, tilting (rotation) about an imaginary axis in the second direction denotes tilting with an imaginary axis parallel to (extending in) the second direction as a rotational center, and tilting (rotation) about an imaginary axis in the third direction denotes tilting with an imaginary axis parallel to (extending in) the third direction as a rotational center.

The digital camera 10 is provided with a camera body 11 and a photographic lens 100 as a photographing optical system. The digital camera 10 is provided in the camera body 11 with a body CPU (movement controller/imaging surface movement controller) 20 and an imaging unit 30. The body CPU 20 controls the overall operations of the camera, performs computational and arithmetic operations, and controls driving of the camera 10. The imaging unit 30 is provided with an image sensor (image pickup device) 31 which captures an object image made incident thereon via the photographic lens 100. The body CPU 20 controls driving of the image sensor 31, processes image signals of captured object images at an image processor 32 to display the captured object images on an image display (monitor) 33, and writes data of the captured object images onto a memory card 34.

The digital camera 10 is provided with a contrast detector 35, a camera input device 21, an AF Unit 22, an exposure controller 23 and a lens communication circuit 24. The contrast detector 35 detects the contrast of an object image from the image signal processed by the image processor 32. The camera input device 21 includes, e.g., control switches, buttons, a dial(s) and/or a touchscreen, which are manually operated by the user to operate all the functions of the camera. The AF Unit 22 drives a focusing optical system (not shown), contained in the photographic lens 100, in the optical axis direction (the direction along the optical axis O) to adjust the focus. The exposure controller 23 controls opening and closing operations of a diaphragm, a shutter, etc., to adjust the quantity of light incident on the image sensor 31 and drives the image sensor 31 to control imaging operations. The lens communication circuit 24 performs communications with the photographic lens 100 to input lens information such as the focal length f, etc., of the photographic lens 100.

The digital camera 10 is provided with a roll detector GSα (which detects turning (rotation) about an imaginary axis in the Z-direction), a pitch detector GSβ (which detects tilt (rotation) about an imaginary axis in the X-direction), a yaw detector GSγ (which detects tilt (rotation) about an imaginary axis in the Y-direction), an X-direction acceleration detector GSX, a Y-direction acceleration detector GSY and a Z-direction acceleration detector GSZ as detectors for detecting shaking (vibrations) of the camera body 11 that is caused by hand shake; each of these six detectors are connected to a camera shake detecting circuit 44. These six detectors can be provided as a combined sensor, e.g., a six-axis sensor, a triple-axis gyro sensor, or a triple-axis acceleration sensor.

The roll detector GSα is a shake detector for detecting angular (rotational) shake about a first direction (optical axis direction) of the digital camera 10. The pitch detector GSβ is a shake detector for detecting angular shake (rotational) about a second direction of the digital camera 10. The yaw detector GSγ is a shake detector for detecting angular shake (rotational) about a third direction of the digital camera 10. The X-direction acceleration detector GSX is a shake detector for detecting shift shake in the second direction of the digital camera 10. The Y-direction acceleration detector GSY is a shake detector for detecting shift shake in the third direction of the digital camera 10. The Z-direction acceleration detector GSZ is a shake detector for detecting shift shake in the first direction (optical axis direction/focusing direction) of the digital camera 10. Hence, the digital camera 10 can detect shake in all six degrees of freedom (6DoF).

The imaging unit 30 is provided with a stage apparatus (mover) 60. The stage apparatus 60 is provided with a movable stage (movable member) 61, a front fixed yoke 62 and a rear fixed yoke 63. The image sensor 31 is fixedly mounted to the movable stage 61, and the front fixed yoke 62 and the rear fixed yoke 63 are positioned in front of and behind the movable stage 61, respectively. The stage apparatus 60 levitationally supports the movable stage 61 (so that the movable stage 61 is magnetically levitated) relative to the front fixed yoke 62 and the rear fixed yoke 63 at least when energized. The image sensor 31 constitutes a low-profile driven member having a flat front surface. In a levitational state, the movable stage 61 of the stage apparatus 60 can translate (linearly move) in the Z-direction (the first direction), translate in the X-direction (second direction) which is orthogonal to the Z-direction, translate in the Y-direction (third direction) which is orthogonal to both the X-direction and the Z-direction, tilt (rotate) about the X-direction (second direction), tilt (rotate) about the Y-direction (third direction), and turn (rotate) about the Z-direction (first direction) to thereby exhibit six axes of motion/motion with six degrees of freedom (6DoF) (see FIGS. 2 through 5). Accordingly, the movable stage 61 of the stage apparatus 60 can translate, rotate, translate while rotating, translate after rotating, rotate after translating, and/or perform a combination of such translating and rotating operations. In the present disclosure, the term "translate" refers to moving along at least one of the X-direction, Y-direction and Z-direction without changing either the orientation or angular displacement of the image plane, corresponding to the light-receiving surface of the image sensor 31 provided on the movable stage, relative to the camera body 11, the term "tilt" refers to rotating about at least one of the X-direction and Y-direction to change the orientation of the image plane relative to the camera body 11, and the term "turn" refers to rotating about the Z-direction so that the image plane rotates about the optical axis O. In addition, the term "levitation" includes the concept of holding the movable stage 61 between the front fixed yoke 62 and the rear fixed yoke 63 in a noncontact state with the front fixed yoke 62 and the rear fixed yoke 63 and the concept of holding the movable stage 61 between the front fixed yoke 62 and the rear fixed yoke 63 in a noncontact state with the front fixed yoke 62 and the rear fixed yoke 63 at a center position (imaging initial position) where the center of the image sensor 31 is coincident with the optical axis O (the Z-axis).

The body CPU 20 inputs information on the focal length f from the photographic lens 100 via, e.g., the lens communication circuit 24, calculates the vibration direction, the vibration speed, etc., of the digital camera 10 based on detection signals input from the pitch detector GSβ, the yaw detector GSγ, the roll detector GSα, the X-direction acceleration detector GSX, the Y-direction acceleration detector GSY and the Z-direction acceleration detector GSZ, calculates the driving direction, the driving speed and the driving amount of the image sensor 31 so that the object image projected onto the image sensor 31 via the photographic lens 100 does not move relative to the image sensor 31 and drives the movable stage 61 of the stage apparatus 60 in with six degrees of freedom (6DoF) (six-axis motion), i.e., translate (shift) the movable member in the X-direction, the Y-direction and/or the Z-direction, tilt (rotate) the movable member about the X-direction and/or the Y-axis, and/or turn (rotate) the movable member about the Z-direction, based on the calculation results. For example, the movable stage 61 can translate (shift), rotate (tilt or turn), translate (shift) while rotating, translate (shift) after rotating, and rotating after translation (shifting). The order of these movements is optional.

The stage apparatus 60 functions as a supporter which supports the movable stage 61, to which the image sensor 31 is fixed, in a manner to allow the movable stage 61 to translate and rotate (tilt or turn) with six degrees of freedom (6DoF) with respect to the front fixed yoke 62 and the rear fixed yoke 63. The movable stage 61 is a rectangular plate (frame) and greater in size than the image sensor 31 as viewed from the front. The front fixed yoke 62 and the rear fixed yoke 63 are rectangular plates (frames) of the same size and have slightly greater outer dimensions than those of the movable stage 61 in a plan view. The front fixed yoke 62 and the rear fixed yoke 63 are provided at the centers thereof with rectangular openings 62a and 63a, respectively, which have greater dimensions than the outer dimensions of the image sensor 31 as viewed from front (as viewed in the Z-direction). The front fixed yoke 62 and the rear fixed yoke 63 are connected and held in parallel with each other with a predetermined distance therebetween via a plurality of connecting columns (not shown) at positions not interfering with the movable stage 61 even when the movable stage 61 is moved (translated, tilted or turned) within a predetermined range.

Figure 2B:
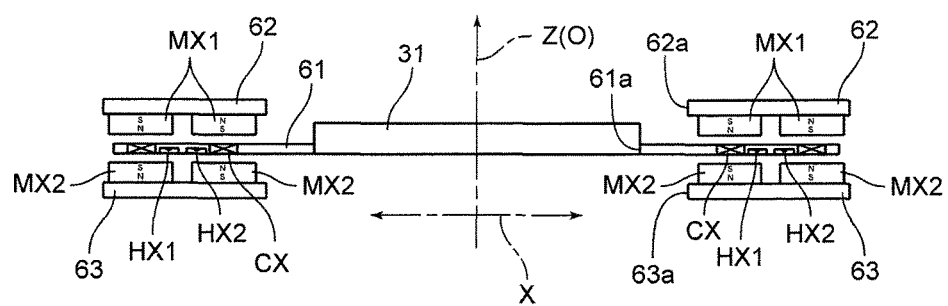
FIG. 2B is a sectional view taken along the section line IIB-IIB shown in FIG. 2A.
Figure 3:
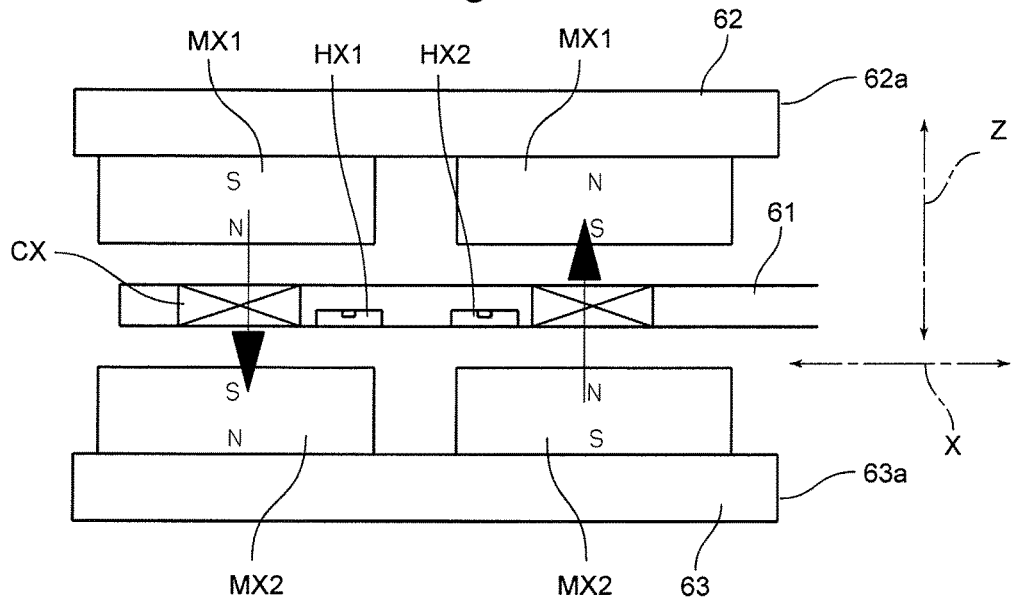
FIG. 3 is an enlarged sectional view of one of a pair of X-drivers shown in FIG. 2B.
Figure 4:
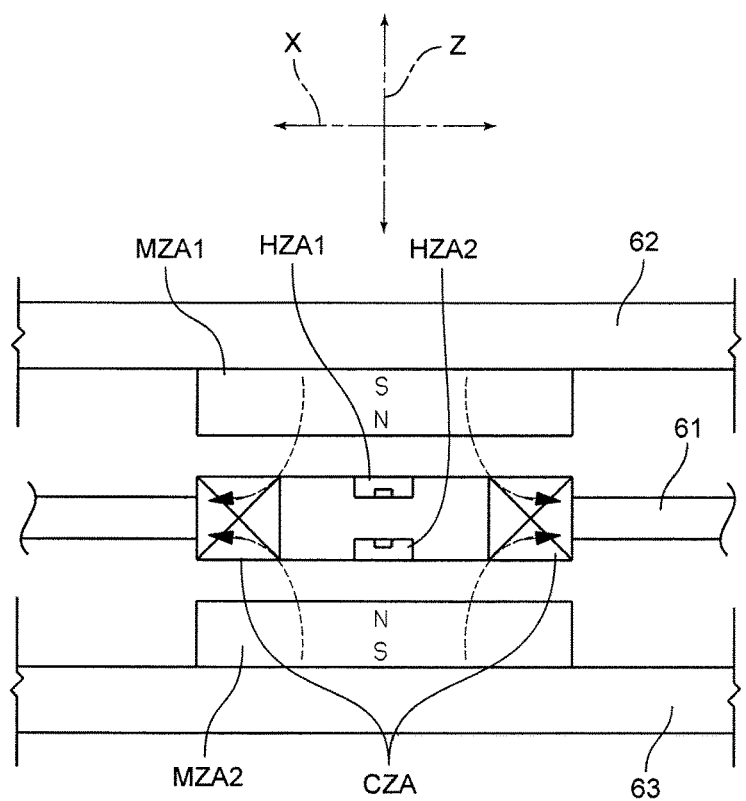
FIG. 4 is an enlarged sectional view taken along the section line IV-IV shown in FIG. 2A.
Figure 5:
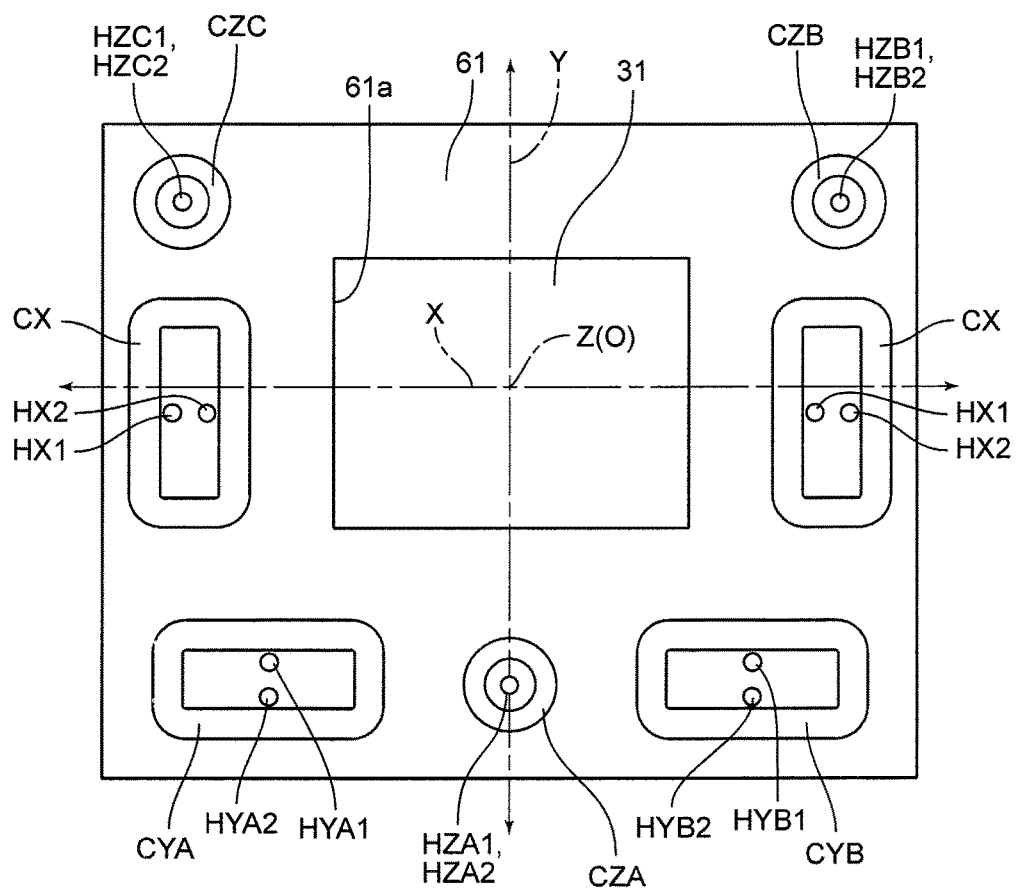
FIG. 5 is a rear elevational view of the movable stage.

The stage apparatus 60 is provided with a left pair of X-direction magnets (second-direction magnets/left and right X-direction magnets) MX1 and a right pair of X-direction magnets (second-direction magnets/left and right X-direction magnets) MX1, each pair being made of two permanent magnets identical in specification. The left pair of X-direction magnets MX1 and the right pair of X-direction magnets MX1 are fixed to the rear of the front fixed yoke 62 (the opposite side of the front fixed yoke 62 from the object side) to be positioned on either side of the opening 62a with respect to the leftward and rightward directions (on either side of the Z-axis with the Y-axis as a center line). Although the stage apparatus 60 is provided with the two pairs of X-direction magnets MX1 on either side of the opening 62a in the X-direction in the present embodiment of the stage apparatus, it is possible for the two pairs of X-direction magnets MX1 to be provided only on one side of the opening 62a with respect to the X-direction. The stage apparatus 60 is provided with a left pair of X-direction magnets MX2 and a right pair of X-direction magnets MX2 which are fixed to the front of the front fixed yoke 63 (the object side surface of the front fixed yoke 63) to face the left pair of X-direction magnets MX1 and the right pair of X-direction magnets MX1, respectively. Each pair of X-direction magnets MX2 is identical in specification to each pair of X-direction magnets MX1. Each X-direction magnet MX1 and MX2 is a plate-like magnet which is elongated in the Y-direction and thin in the Z-direction. The left and right X-direction magnets MX1 of each pair are arranged parallel to the Y-axis and spaced from each other in the X-direction; likewise, the left and right X-direction magnets MX2 of each pair are arranged parallel to the Y-axis and spaced from each other in the X-direction. In each pair of X-direction magnets MX1, the front and the rear sides of one X-direction magnet MX1 (the left X-direction magnet MX1 with respect to FIG. 2B) are the north pole and the south pole, respectively, while the front and the rear sides of the other X-direction magnet MX1 (the right X-direction magnet MX1 with respect to FIG. 2B) are the south pole and the north pole, respectively. Each pair of X-direction magnets MX2 are positioned with respect to the associated pair of X-direction magnets MX1 so that opposite magnetic poles are placed face-to-face in the Z-direction as shown in FIGS. 2B and 3. With the passage of magnetic flux of each pair of X-direction magnets MX1 and the associated pair of X-direction magnets MX2 through the front fixed yoke 62 and the rear fixed yoke 63, a portion of a magnetic circuit which generates thrust in the X-direction (the second direction) is formed between each pair of X-direction magnets MX1 and the associated pair of X-direction magnets MX2 (see FIG. 3).

The stage apparatus 60 is provided with a left pair of Y-direction magnets (upper and lower Y-direction magnets) MYA1 and a right pair of Y-direction magnets (upper and lower Y-direction magnets) MYB1, each pair being made of two permanent magnets identical in specification. The left pair of Y-direction magnets MYA1 and the right pair of Y-direction magnets MYB1 are fixed to the rear of the front fixed yoke 62 to be positioned below the opening 62a (to be spaced downward from the Z-axis with the Y-axis as a center line). The stage apparatus 60 is further provided with a left pair of Y-direction magnets (upper and lower Y-direction magnets) MYA2 and a right pair of Y-direction magnets (upper and lower Y-direction magnets) MYB2, each pair being made of two permanent magnets identical in specification. The left pair of Y-direction magnets MYA2 and the right pair of Y-direction magnets MYB2 are fixed to the front of the rear fixed yoke 63 to face the left pair of Y-direction magnets MYA1 and the right pair of Y-direction magnets MYB1, respectively. Each Y-direction magnet MYA1, MYB1, MYA2 and MYB2 is a plate-like magnet which is elongated in the X-direction and thin in the Z-direction. The upper and lower Y-direction magnets MYA1 are arranged parallel to the X-axis and spaced from each other in the Y-direction and the upper and lower Y-direction magnets MYB1 are arranged parallel to the X-axis and spaced from each other in the Y-direction. Likewise, the upper and lower Y-direction magnets MYA2 are arranged parallel to the X-axis and spaced from each other in the Y-direction and the upper and lower Y-direction magnets MYB2 are arranged parallel to the X-axis and spaced from each other in the Y-direction. In each pair of Y-direction magnets MYA1 and MYB1, the front and the rear of one Y-direction magnet MYA1 or MYB1 (the upper Y-direction magnet MYA1 or MYB1 with respect to FIG. 2A) are the south pole and the north pole, respectively, while the front and the rear of the other Y-direction magnet MYA1 or MYB1 (the lower Y-direction magnet MYA1 or MYB1 with respect to FIG. 2A) are the north pole and the south pole, respectively. Each pair of Y-direction magnets MYA2 and MYB2 are positioned with respect to the associated pair of Y-direction magnets MYA1 and MYA2 so that opposite magnetic poles are placed face-to-face in the Z-direction. With the passage of magnetic flux of each pair of Y-direction magnets MYA1 and the associated pair of Y-direction magnets MYA2 through the front fixed yoke 62 and the rear fixed yoke 63, a portion of a magnetic circuit which generates thrust in the Y-direction (the third direction) is formed between each pair of Y-direction magnets MYA1 and the associated pair of Y-direction magnets MYA2.

The stage apparatus 60 is further provided on the rear of the front fixed yoke 62 with three Z-direction magnets MZA1, MZB1 and MZC1 (see FIG. 2A), at three positions different from the positions of the left pair of X-direction magnets MX1, the right pair of X-direction magnets MX1, the left pair of Y-direction magnets MYA1 and the right pair of Y-direction magnets MYB1. The stage apparatus 60 is provided on the front of the rear fixed yoke 63 with three Z-direction magnets MZA2, MZB2 and MZC2.

Each Z-direction magnet MZA1, MZB1, MZC1, MZA2, MZB2 and MZC2 is a plate-like magnet which is rectangular (substantially square) in shape as viewed from the front. The Z-direction magnets MZA1, MZB1 and MZC1 are fixed to the rear side of the front fixed yoke 62 so that the front side (that is in contact with the front fixed yoke 62) and the rear side of each Z-direction magnet act as the south pole and the north pole, respectively (i.e., the south and north poles of each Z-direction magnet face forward and rearward, respectively), while the Z-direction magnets MZA2, MZB2 and MZC2 are fixed to the front of the rear fixed yoke 63 so that the same magnetic poles are placed face-to-face between each Z-direction magnet MZA2, MZB2 and MZC2 and the associated Z-direction magnet MZA1, MZB1 or MZC1. The Z-direction magnets MZA1, MZB1, MZC1, MZA2, MZB2 and MZC2 are identical in specification. In addition, the Z-direction magnets MZA1, MZB1 and MZC1 lie in a plane (first plane) orthogonal to the Z-axis and are arranged at substantially equi-angular intervals about the Z-axis. Likewise, the Z-direction magnets MZA2, MZB2 and MZC2 lie in a plane (second plane parallel to the aforementioned first plane) orthogonal to the Z-axis and are arranged at substantially equi-angular intervals about the Z-axis to face the Z-direction magnets MZA1, MZB1 and MZC1 in the Z-direction, respectively. With the passage of magnetic flux of each Z-direction magnet MZA1, MZB1 and MZC1 and the associated Z-direction magnet MZA2, MZB2 or MZC2 through the front fixed yoke 62 and the rear fixed yoke 63, a portion of a magnetic circuit which generates thrust in the Z-direction (the first direction) is formed between each Z-direction magnet MZA1, MZA2 and MZA3 and the associated Z-direction magnet MZB1, MZB2 or MZBC.

The movable stage 61, which is positioned between the front fixed yoke 62 and the rear fixed yoke 63, is a nonmagnetic member which is formed of a nonmagnetic material as a single-piece member by press-molding. The movable stage 61 is provided at a central portion thereof with an image sensor mounting hole 61a, having the shape of a rectangle as viewed from the front, and the image sensor 31 is fitted into the image sensor mounting hole 61a and fixed thereto. The image sensor 31 protrudes from the image sensor mounting hole 61a forwardly toward the front of the movable stage 61 in the optical axis direction.

When the movable stage 61 sits at the initial position (with the movable stage 61 magnetically levitated), the image sensor 31 is positioned so that the long sides of the image sensor 31 extend parallel to the X-axis and so that the short sides of the image sensor 31 extend parallel to the Y-axis. When the movable stage 61 sits at the initial position, the center of the imaging surface of the image sensor 31 is positioned on the optical axis O of the photographic lens 100, and the optical axis O and the Z-axis are aligned with each other. The Z-direction (the first direction), the X-direction (the second direction) and the Y-direction (the third direction) will be hereinafter described as fixed directions with respect to the camera body 11 and the photographic lens 100, with the Z-direction parallel to (including being aligned with) the optical axis O; however, the Z-direction (the first direction), the X-direction (the second direction) and the Y-direction (the third direction) can be fixed directions with respect to the image sensor 31.

The stage apparatus 60 is provided with a pair of X-drive coils (X-driver) CX which are fixed to the movable stage 61 on either side (left and right sides) of the image sensor 31 in the X-direction to be located to the left and right of the left and right sides (short sides) of the image sensor 31, respectively. The stage apparatus 60 is provided with a pair of Y-drive coils: a Y-drive coil (YA-driver) CYA and a Y-drive coil (YB-driver) CYB which are fixed to the movable stage 61 to be located below the lower side (long side) of the image sensor 31 and to be spaced from each other in the leftward and rightward directions (i.e., in the X-direction). The pair of X-drive coils (X-driver) CX are vertically elongated in the Y-direction and arranged at symmetrical positions with respect to the Y-axis (at equi-distant positions from the Y-axis) so that the longitudinal directions of the pair of X-drive coils CX extend parallel to the Y-direction and intersect the X-axis. The pair of Y-drive coils CYA and CYB are laterally elongated in the X-direction and arranged at symmetrical positions with respect to the Y-axis (at equi-distant positions from the Y-axis) so that the longitudinal directions of the pair of Y-drive coils CYA and CYB extend parallel to the X-direction. According to this arrangement, manufacture, adjustment and control of the stage apparatus 60 is facilitated.

The stage apparatus 60 is further provided with three circular coils: a Z-drive coil (ZA-driver) CZA, a Z-drive coil (ZB-driver) CZB and a Z-drive coil (ZC-driver) CZC which are fixed to the movable stage 61. The Z-drive coil CZA is fixed at a position (middle position) between the pair of Y-drive coils CYA and CYB, and the Z-drive coils CZB and CZC are fixed above the pair of X-drive coils CX, respectively. The Z-drive coil CZA is arranged on the Y-axis, and the Z-drive coils CZB and CZC are arranged to be symmetrical with respect to the Y-axis (at equi-distant positions from the Y-axis). The center of gravity (the center of gravity of the whole) of the Z-drive coils CZA, CZB and CZC is substantially coincident with the center of gravity of the movable stage 61. It is desirable that the Z-drive coils CZA, CZB and CZC be arranged so that a line which connects two of the three Z-drive coils CZA, CZB and CZC extends parallel to one of the X-axis and the Y-axis and so that a line which extends from the remaining one of the three Z-drive coils CZA, CZB and CZC and is orthogonal to the aforementioned connecting line extends parallel to (or aligns with) the other of the X-axis and the Y-axis. In the first embodiment of the stage apparatus, the Z-drive coils CZA, CZB and CZC are arranged so that a line which connects the two Z-drive coils CZB and CZC extends parallel to the X-axis and so that a line which extends from the Z-drive coil CZA and is orthogonal to the aforementioned connecting line aligns with the Y-axis as shown in FIG. 2A. According to this arrangement, manufacture, adjustment and control of the stage apparatus 60 is facilitated.

The pair of X-drive coils CX, the pair of Y-drive coils CYA and CYB and the three Z-drive coils CZA, CZB and CZC are flat (thin) coils which are arranged to be parallel to a plane (X-Y plane) orthogonal to the optical axis O. Each of these seven flat coils is made of a plurality of turns of a conductive wire wound in the X-Y plane which are in turn multi-layered in the thickness direction of the movable stage 61 (i.e., in the Z-direction).

The pair of X-drive coils CX are arranged so that the long portions (long sides) thereof extend parallel to the Y-axis and so that the front and rear surfaces of each X-drive coil CX face the pair of X-direction magnets MX1 and the pair of X-direction magnets MX2, respectively, while the pair of Y-drive coils CYA and CYB are arranged so that the long portions (long sides) thereof extend parallel to the X-axis, so that the front and rear surfaces of the Y-drive coil CYA face the pair of Y-direction magnets MYA1 and the pair of Y-direction magnets MYA2, respectively, and so that the front and rear surfaces of the Y-drive coil CYB face the pair of Y-direction magnets MYB1 and the pair of X-direction magnets MYB2, respectively.

The pair of X-drive coils (X-driver) CX, the Y-drive coil (YA-driver) CYA, the Y-drive coil (YB-driver) CYB, the Z-drive coil (ZA-driver) CZA, the Z-drive coil (ZB-driver) CZB and the Z-drive coil (ZC-driver) CZC are all connected to an actuator drive circuit 42 (see FIG. 1), and the passage of electric current through each of these seven coils is controlled via the actuator drive circuit 42.

Each X-drive coil CX and the associated front and rear pairs of X-direction magnets MX1 and MX2 constitute a second thrust generator which generates thrust in the X-direction (the second direction). The movable stage 61 can be translated in the X-direction by the thrust force in the X-direction which is generated by controlling the current through the pair of X-drive coils CX. Each X-drive coil CX and the associated X-direction magnets MX1 and MX2 also act (function) as a levitator which levitates and holds the movable stage 61 at a center position (initial position) regardless of the attitude of the camera body 11, e.g., when the camera is held in a vertical position in which the grip of the camera body 11 faces up or down, or at an inclined angle other than a horizontal position.

The Y-drive coil CYA and the associated front and rear pairs of Y-direction magnets MYA1 and MYA2, and the Y-drive coil CYB and the associated front and rear pairs of Y-direction magnets MYB1 and MYB2 constitute a pair of third thrust generators (thrust controllers), each of which generates thrust in the Y-direction (the third direction). The movable stage 61 can be translated in the Y-direction and turned (rotated) about an imaginary axis in the Z-direction by interaction of two thrust forces in the Y-direction which are generated by controlling the currents through the pair of Y-drive coils CYA and CYB, spaced from each other in the X-direction. The Y-drive coil CYA and the pair of Y-direction magnets MYA1 and MYA2, and the Y-drive coil CYB and the pair of Y-direction magnets MYB1 and MYB2 also act (function) as a levitator which levitates and holds the movable stage 61 at a center position (initial position) regardless of the attitude of the camera body 11, and especially when the camera is held in a normal position (horizontal position).

The three Z-drive coils CZA, CZB and CZC are arranged so that the front and rear surfaces of the Z-drive coil CZA face the front and rear Z-direction magnets MZA1 and MZA2, respectively, so that the front and rear surfaces of the Z-drive coil CZB face the front and rear Z-direction magnets MZB1 and MZB2, respectively, and so that the front and rear surfaces of the Z-drive coil CZC face the front and rear Z-direction magnets MZC1 and MZC2, respectively. The Z-drive coil CZA and the front and rear Z-direction magnets MZA1 and MZA2, the Z-drive coil CZB and the front and rear Z-direction magnets MZB1 and MZB2, and the Z-drive coil CZC and the front and rear Z-direction magnets MZC1 and MZC2 constitute three first thrust generators, each of which generates thrust in the Z-direction (the first direction). The movable stage 61 is levitated without contacting either the front fixed yoke 62 or the rear fixed yoke 63 (without contacting any of the three pairs of Z-direction magnets MZA1 and MZA2, MZB1 and MZB2, and MZC1 and MZC2), translated in the Z-direction, tilted about the X-direction and tilted about the Y-direction by interaction of three thrust forces in the Z-direction which are generated by controlling the currents through the three Z-drive coils CZA, CZB and CZC.

The Z-drive coils CZA, CZB and CZC and the pairs of Z-direction magnets MZA1 and MZA2, MZB1 and MZB2, and MZC1 and MZC2 also act (function) as a levitator which levitates and holds the movable stage 61 at an initial position relative to the optical axis direction and at an initial attitude (at an initial position in which the imaging surface of the image sensor 31 is orthogonal to the optical axis O).

The stage apparatus 60 is provided with two pairs of X-direction Hall elements (magnetic sensors), two pairs of Y-direction Hall elements (magnetic sensors) and three pairs of Z-direction Hall elements (magnetic sensors). More specifically, the stage apparatus 60 is provided with a left pair of X-direction Hall elements HX1 and HX2 (X-position detector HX), a right pair of X-direction Hall elements HX1 and HX2 (X-position detector HX), a left pair of Y-direction Hall elements HYA1 and HYA2 (YA-position detector HXA), a right pair of Y-direction Hall elements HYB1 and HYB2 (YA-position detector HXB), a pair of Z-direction Hall elements HZA1 and HZA2 (ZA-position detector), a pair of Z-direction Hall elements HZB1 and HZB2 (ZB-position detector) and a pair of Z-direction Hall elements HZC1 and HZC2 (ZC-position detector). These Hall elements HX1, HX2, HYA1, HYA2, HYB1, HYB2, HZA1, HZA2, HZB1, HZB2, HZC1 and HZC2 are all fixed to the movable stage 61. The left pair of X-direction Hall elements HX1 and HX2 are positioned in the air-core area of the left X-drive coil CX, and the right pair of X-direction Hall elements HX1 and HX2 are positioned in the air-core area of the right X-drive coil CX. The left pair of Y-direction Hall elements HYA1 and HYA2 are positioned in the air-core area of the left Y-drive coil CYA, and the right pair of Y-direction Hall elements HYB1 and HYB2 are positioned in the air-core area of the right Y-drive coil CYB. The pair of Z-direction Hall elements HZA1 and HZA2 are positioned in the air-core area of the Z-drive coil CZA, the pair of Z-direction Hall elements HZB1 and HZB2 are positioned in the air-core area of the Z-drive coil CZB, and the pair of Z-direction Hall elements HZC1 and HZC2 are positioned in the air-core area of the Z-drive coil CZC. Each pair of X-direction Hall elements HX1 and HX2 are positioned at an approximate center of the associated X-drive coil CX in the Y-direction (the short-side direction of the image sensor 31) and spaced from each other with a predetermined distance therebetween in the X-direction (the long-side direction of the image sensor 31). Each pair of Y-direction Hall elements HYA1 and HYA2, and HYB1 and HYB2 are positioned at an approximate center of the associated Y-drive coil CYA or CYB in the X-direction (the long-side direction of the image sensor 31) and spaced from each other with a predetermined distance therebetween in the Y-direction (the short-side direction of the image sensor 31). Each pair of Z-direction Hall elements HZA1 and HZA2, HZB1 and HZB2, and HZC1 and HZC2 are positioned to lie on the axis of the associated Z-drive coil CZA, CZB or CZC and spaced from each other with a predetermined distance therebetween in the Z-direction.

Each pair of X-direction Hall elements HX1 and HX2 (X-position detector HX), each pair of Y-direction Hall elements HYA1 and HYA2 (YA-position detector HXA) and HYB1 and HYB2 (YA-position detector HXB) and each pair of Z-direction Hall elements HZA1 and HZA2 (ZA-position detector HZA), HZB1 and HZB2 (ZB-position detector HZB) and HZC1 and HZC2 (ZC-position detector HZC) are all connected to a position detection circuit 43 (see FIG. 1).

Each pair of X-direction Hall elements HX1 and HX2 constitute an X-direction position detector (translation-direction position detector) which detects the magnetic force (magnetic flux of an X-direction magnetic circuit) of the associated pairs of X-direction magnets MX1 and MX2 to detect the position of the movable stage 61 in the X-direction (the translation direction position in the X-direction) based on detection signals output from the X-direction Hall elements HX1 and HX2.

The pair of Y-direction Hall elements HYA1 and HYA2 detects the magnetic force of the associated pairs of Y-direction magnets MYA1 and MYA2 (magnetic flux of a Y-direction magnetic circuit), and the pair of Y-direction Hall elements HYB1 and HYB2 detects the magnetic force of the associated pairs of Y-direction magnets MYB1 and MYB2 (magnetic flux of a Y-direction magnetic circuit). Subsequently, the position of the movable stage 61 in the Y-direction and the turning position (rotational position) of the movable stage 61 about the Z-direction are detected based on detection signals output from the Y-direction Hall elements HYA1 and HYA2 and detection signals output from the Y-direction Hall elements HYB1 and HYB2. Accordingly, the pair of Y-direction Hall elements HYA1 and HYA2 and the pair of Y-direction Hall elements HYB1 and HYB2 each constitute a Y-direction position detector (translation direction position detector) which detects the position of the movable stage 61 in the Y-direction (the translation direction position of the movable stage 61 in the Y-direction) and a turning position (rotational position) detector which detects the turning position of the movable stage 61 about the Z-direction.

Each pair of Z-direction Hall elements HZA1 and HZA2, HZB1 and HZB2, and HZC1 and HZC2 detect the magnetic force of the associated pair of Z-direction magnets MZA1 and MZA2, MZB1 and MZB2, or MZC1 and MZC2 (magnetic flux of a Z-direction magnetic circuit) to detect the position of the movable stage 61 in the Z-direction (the translation direction position in the Z-direction), the tilting position of the movable stage 61 about the X-direction and the tilting position of the movable stage 61 about the Y-direction based on detection signals output from the three pairs of Z-direction Hall elements HZA1 and HZA2, HZB1 and HZB2, and HZC1 and HZC2. Accordingly, the three pairs of Z-direction Hall elements HZA1 and HZA2, HZB1 and HZB2, and HZC1 and HZC2 constitute both a Z-direction position detector (translation direction position detector) which detects the position of the movable stage 61 in the Z-direction (the translation direction position in the Z-direction), a tilting position detector which detects the tilting position of the movable stage 61 about the X-direction and a tilting position detector which detects the tilting position of the movable stage 61 about the Y-direction.

The X-drive coils CX, the Y-drive coils CYA and CYB and the Z-drive coils CZA, CZB and CZC, the X-direction Hall elements HX (H×1 and H×2), the Y-direction Hall elements HYA (HYA1 and HYA2) and HYB (HYB1 and HYB2), and the Z-direction Hall elements HZA (HZA1 and HZA2), HZB (HZB1 and HZB2) and HZC (HZC1 and HZC2) are all mounted on a flexible printed circuit (FPC) board (not shown) and are electrically connected to a circuit incorporated in the camera body 11 such as the actuator drive circuit 42 or the position detection circuit 43 via a flexible printed wiring board (flexible PWB) (not shown) which extends from the movable stage 61 (see FIG. 1).

The actuator drive circuit 42 controls energization of the pair of X-drive coils CX, the pair of Y-drive coils CYA and CYB, and the three Z-drive coils CZA, CZB and CZC. The operation of the actuator drive circuit 42 is controlled by the body CPU 20 via an anti-shake control circuit 41 which is connected between the body CPU 20 and the actuator drive circuit 42 as shown in FIG. 1.

The position detection circuit 43 detects the positions of the movable stage 61 in the X-direction, the Y-direction and the Z-direction, the tilting direction of the movable stage 61 about the X-direction (the tilting (rotating) angle/pitch angle about the X-direction), the tilting direction of the movable stage 61 about the Y-direction (the tilting (rotating) angle/yaw angle about an imaginary axis in the Y-direction) and the turning (rotation) direction of the movable stage 61 about the Z-direction (the turning (rotating) angle/roll angle about the Z-direction) from detection signals input from the X-direction Hall elements HX1 and HX2, the Y-direction Hall elements HYA1 and HYA2, and HYB1 and HYB2 and the Z-direction Hall elements HZA1 and HZA2, HZB1 and HZB2, and HZC1 and HZC2.

The digital camera 10 detects the positions of the movable stage 61 (i.e., the positions of the image sensor 31) in the X-direction, the Y-direction and the Z-direction, the rotational position (tilting position) of the movable stage 61 about the X-direction, the rotational position (tilting position) of the movable stage 61 about the Y-direction, and the rotational position of the movable stage 61 about the Z-direction in a manner which will be discussed thereinafter.

The position detection circuit 43 detects the position (the amount of movement) of the movable stage 61 in the X-direction by performing arithmetic computations based on the sum signal of the detection signals input from the pair of X-direction Hall elements HX1 and HX2.

The position detection circuit 43 detects the position of the pair (left pair) of Y-direction Hall elements HYA1 and HYA2 in the Y-direction by performing arithmetic computations based on the sum signal of the detection signals input from the pair of Y-direction Hall elements HYA1 and HYA2 and detects the position of the pair (right pair) of Y-direction Hall elements HYB1 and HYB2 in the Y-direction by performing arithmetic computations using the detection signals input the pair of Y-direction Hall elements HYB1 and HYB2, e.g., based on the sum signal of the detection signals input from the pair of Y-direction Hall elements HYB1 and HYB2. Based on these two positions in the Y-direction that are spaced from each other in the X-direction, the position detection circuit 43 detects the position (the amount of movement) of the movable stage 61 in the Y-direction and the turning position (the amount of rotation) of the movable stage 61 about the Z-direction.

In addition, the position detection circuit 43 detects the positions of the movable stage 61 in the Z-direction at three different points (detects the position of the movable stage 61 in the Z-direction, the tilting position of the movable stage 61 about the X-direction and the tilting position of the movable stage 61 about the Y-direction) by performing arithmetic computations using detection signals input from the three pairs of Z-direction Hall elements HZA1 and HZA2, HZB1 and HZB2, and HZC1 and HZC2 by performing arithmetic computations, e.g., based on the quotient of the sum of a pair of detection signals and the difference of this pair of detection signals. Thereupon, based on the positions of the movable stage 61 in the Z-direction at the three different points, the position detection circuit 43 detects the position (the amount of movement) of the movable stage 61 in the Z-direction, the tilting position (rotation position) of the movable stage 61 about an imaginary axis in the X-direction and the tilting position (rotation position) of the movable stage 61 about an imaginary axis in the Y-direction.

In the above illustrated embodiment of the stage apparatus, the position detection accuracy in the X-direction and the Y-direction does not fluctuate even when the movable stage 61 moves in the Z-direction because the pair of X-direction Hall elements HX1 and HX2 that detect the position of the movable stage 61 in the X-direction are provided at a predetermined distance therebetween in the X-direction, because the pair of Y-direction Hall elements HYA1 and HYA2 that detect the position of the movable stage 61 in the Y-direction are provided at a predetermined distance therebetween in the Y-direction, and because the pair of Y-direction Hall elements HYB1 and HYB2 that detect the position of the movable stage 61 in the Y-direction are provided at a predetermined distance therebetween in the Y-direction.

The position detection accuracy in the Z-direction does not deteriorate even when the movable stage 61 translates in the X-direction or the Y-direction or tilts about the X-direction or the Y-direction because each of the three pairs of Z-direction Hall elements HZA1 and HZA2, HZB1 and HZB2, and HZC1 and HZC2 that detect the position of the movable stage 61 in the Z-direction are provided at a predetermined distance between the pair of Hall elements in the Z-direction.

Under control of the body CPU 20, the digital camera 10 levitates the image sensor 31 of the movable stage 61 in between the front fixed yoke 62 and the rear fixed yoke 63 by controlling energization of the pair of X-drive coils CX, the pair of Y-drive coils CYA and CYB and the three Z-drive coils CZA, CZB and CZC via the actuator drive circuit 42 based on the positions calculated by the position detection circuits 43.

The digital camera 10 can carry out the below-described drive control with the image sensor 31 of the movable stage 61 in a levitated state based on each position calculated by the body CPU 20 (position detection circuits 43).

The movable stage 61 (the image sensor 31) can be translated in the Z-direction by interaction of three equal thrust forces in the Z-direction that are generated by controlling currents through the three Z-drive coils CZA, CZB and CZC by equal amounts. Furthermore, the movable stage 61 can be tilted (rotated) about the X-direction and can be tilted (rotated) about the Y-direction by interaction of three different thrust forces in the Z-direction that are generated by individually controlling currents through the three Z-drive coils CZA, CZB and CZC.

The movable stage 61 can be translated in the X-direction by a thrust force in the X-direction that is generated by controlling a current through each X-drive coil CX.

The movable stage 61 can be translated in the Y-direction by interaction of two thrust forces in the Y-direction that are generated by controlling currents through the Y-drive coils CYA and CYB by equal amounts. Furthermore, the movable stage 61 can be turned (rotated) about the Z-direction by interaction of two different thrust forces in the Y-direction that are generated by individually controlling currents through the Y-drive coils CYA and CYB.

Hence, the movable stage 61 can be translated, tilted/turned, tilted/turned while being translated, translated after being tilted/turned, and tilted/turned after being translated in all six directions with six degrees of freedom (6DoF) by interaction of thrust forces in the Z-direction, thrust forces in the X-direction and thrust forces in the Y-direction which are generated by controlling currents in the Z-drive coils CZA, CZB and CZC, the X-drive coil(s) CX and the Y-drive coils CYA and CYB.

The digital camera 10 is further provided with rotational adjustment circuit 46 and rotational-operation switches 45 for tilting (in swing-and-tilt photography), panning and rolling the image sensor 31 via the movable stage 61. The rotational adjustment circuit 46 receives input from the rotational-operation switches 45 to rotate (turn/tilt) the movable stage 61 via the actuator drive circuit 42. The rotational state of the movable stage 61 is detected based on detection signals of the X-direction Hall elements HX1 and HX2, the Y-direction Hall elements HYA1, HYA2, HYB1 and HYB2, and the Z-direction Hall elements HZA1, HZA2, HZB1, HZB2, HZC1 and HZC2. Furthermore, the rotational state of the movable stage 61 can be held by controlling currents in the X-drive coil(s) CX, in the Y-drive coils CYA and CYB, and in the Z-drive coils CZA, CZB and CZC. The rotational-operation switches 45 are manual switches that are operated by the user (photographer), and can include, e.g., a multi-way switch, or an electronic dial, etc. Hence, the user can tilt, pan, roll the image sensor 31, or translate the image sensor 31 in the optical axis direction or in a direction orthogonal to the optical axis direction, by operating the rotational-operation switches 45 while viewing the image display 33 while image data that is photographed by the image sensor 31 is displayed on the image display 33.

The digital camera 10 can carry out a shake (hand shake) correction operation by synchronizing the above-described drive control of the movable stage 61 with the shake (vibrations) of the camera body 11 and the photographic lens 100 detected by the camera shake detecting circuit 44.

Upon the power being turned ON, the body CPU 20 of the digital camera 10 drives the stage apparatus 60 via the anti-shake control circuit 41 and the actuator drive circuit 42 to hold the image sensor 31 of the movable stage 61 at an initial position, at which an imaging surface 31a is orthogonal to the optical axis O, the optical axis O passes through the center of the imaging surface 31a, and the position of the imaging surface 31a with respect to the direction of the optical axis (O) is aligned with the design optical axis position. The digital camera 10, in an initial state in which the image sensor 31 is held at the initial position, carries out photographing preparation operations such as carrying out a focal adjustment before a photographing operation and a photometering operation, etc., carries out a shake-correction operation, and a monitor image that is captured by the image sensor 31 is displayed on the image display 33. Furthermore, upon photographing instruction signals being input via a switch (not shown), a still image is captured by the image sensor 31, and the object image data of the still image is written onto a memory card 34.

Figure 7A:
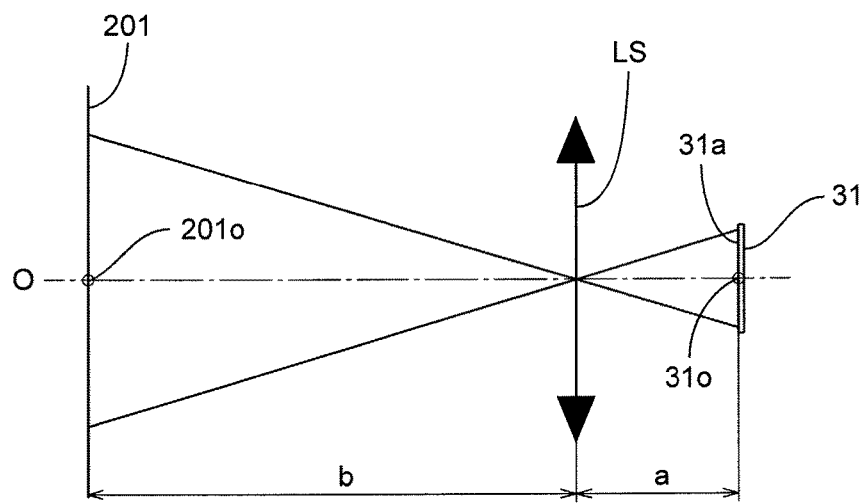
FIG. 7A is a diagram showing an object surface, a principal plane of a photographing lens of the photographing apparatus, and an imaging sensor of the photographing apparatus in an initial state.

A first embodiment of a shake correction operation that is carried out by the digital camera 10 will be discussed with reference to FIGS. 6 through 11B. FIG. 7A is a simplified illustration of the relationship between an object (object surface 201), a principal plane LS of the photographic lens 100, and the imaging surface 31a of the image sensor 31, when the image sensor 31 is held in the initial position in the initial state. Note that, strictly speaking, a principal plane includes a front principal plane and a rear principal plane, however, in the present disclosure these planes are shown as a simplified single principal plane LS. In this initial state, the position at which the optical axis O intersects with the object surface 201 is designated as the photographing area center 201o and aligns with an imaging surface center 31o, which is the center of the imaging surface 31a. The following imaging formulas are attained in FIG. 7A:

$$1/f = 1/a + 1/b, \text{ and}$$

m=a/b, wherein the focal length of the photographic lens 100 is designated as "f", the distance between the principal plane LS and the object surface 201 (the object distance) is designated as "b", and the distance between the principal plane LS and the imaging surface 31a (the image plane distance) is designated as "a", wherein "m" designates the magnification (optical magnification).

Note that the object distance "b" and the image plane distance "a" are determined as distances from the principal plane LS.

The image plane distance "a" is detected from the optical-axis position of a focal adjustment lens group (not shown) of the photographic lens 100, and the object distance "b" is detected by the image plane distance "a" and the focal length "f" of the photographic lens 100.

The digital camera 10 carries out a shake correction operation so that the image of the object surface 201 on the imaging surface 31a at the initial state does not fluctuate even if angular shake (angular shake about the X-direction) and shift shake (shake in the X-direction, the Y-direction, and/or in the focusing direction; and/or translational shake in the Z-direction) occur. The shake correction operation that is carried out by the digital camera 10 will be described hereinbelow with reference to the flowchart of FIG. 6. The body CPU 20 performs the overall control of the shake correction operation by running a predetermined program that is stored in a memory (not shown). The image sensor 31 is held at the initial position shown in FIG. 7A.

The body CPU 20 calculates a magnification amount (magnification) "m" from the object distance b and the image plane distance a, and stores this magnification amount "m" in an embedded RAM 20a (S11).

The body CPU 20 inputs shake amounts from the camera shake detecting circuit 44 (S13, S15, S17). Specifically, the body CPU 20 inputs (calculates) the angular shake amount about the Z-direction (rotational angle about the Z-direction), the angular shake amount about the X-direction (rotational angle about the X-direction) and the angular shake amount about the Y-direction (rotational angle about the Y-direction) detected from detection signals of the roll detector GSα, the pitch detector GSβ and the yaw detector GSγ, respectively; the body CPU 20 inputs (calculates) the X-direction shake amount (X-direction shift amount) detected from the detection signals of the X-direction acceleration detector GSX and the Y-direction shake amount (Y-direction shift amount) detected from the detection signals of the Y-direction acceleration detector GSY (S15); and the body CPU 20 inputs (calculates) the Z-direction shake amount (focusing direction shift amount) detected from the detection signals of the Z-direction acceleration detector GSZ (S17).

The body CPU 20 calculates an image-surface tilt correction amount (a tilt angle about the Z-direction, a tilt angle about the X-direction and a tilt angle about the Y-direction) based on the inputted rotational angle about the Z-direction, rotational angle about the X-direction and the rotational angle about the Y-direction, and carries out a tilt correction (rotation) of the image sensor 31 based on this calculated image-surface tilt correction amount (S19). Furthermore, the body CPU 20 calculates an optical-axis correction amount based on the input X-direction shift amount and the input Y-direction shift amount, and carries out an optical-axis correction (X-direction transition and Y-direction transition) of the image sensor 31 based on this calculated optical-axis correction amount (S21). Furthermore, the body CPU 20 calculates a focusing correction amount based on the input focusing direction shift amount, and carries out a focusing correction (translation in the focusing direction (direction of optical axis O)) on the image sensor 31 based on the input focusing correction amount (S23). Thereafter, control returns to step S13, and repeats the shake amount detection and correction operations in steps S13 through S23.

The shake correction operation continues by repeating the above-described shake amount detections and correction operations, so that an appropriate shake-correction effect can be maintained. The digital camera 10 carries out a photographing operation upon, e.g., a photographing instruction signal being input during the shake-correction operation, and the shake-correction operation ends upon the power of the digital camera 10 being turned OFF.

The inputting order of the shake amounts at steps S13, S15 and S17, and the inputting order of the order of the correction operations at steps S19, S21 and S23 are not limited to the illustrated embodiment, and can be carried out at an arbitrary order. Furthermore, if a shake amount is not detected, a shake-correction operation is not carried out.

Figure 7B:
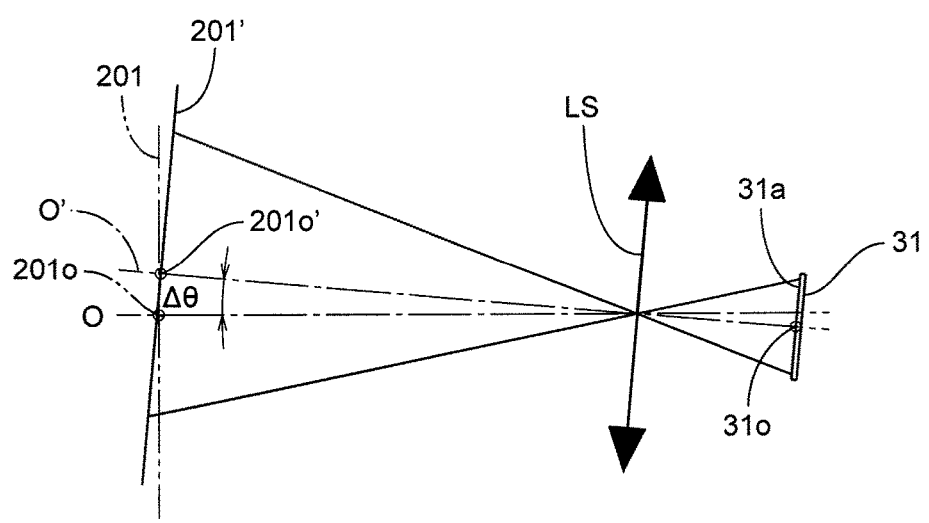
FIG. 7B is a diagram showing a rotated (tilted) state, with respect to the initial state of FIG. 7A, caused by angular shake.

Details of the shake-correction operations of steps S19, S21 and S23 will be herein described with reference to FIGS. 7A through 11B. FIG. 7B shows a state in which the entire digital camera 10 has tilted due to angular (rotational) shake from the initial state shown in FIG. 7A. The designators shown in FIGS. 7A through 11B are defined as follows:

$\Delta\theta$ designates an angular (rotational) shake amount.
$\Delta h$ designates a shift shake (X and Y directions) amount.
$\Delta b$ designates a shift shake (focusing direction shift) amount.

Image-surface tilt correction amount=$\Delta\theta \times m$.

Optical axis correction amount=$a \times \tan \Delta\theta + \Delta h \times m$.

Focusing correction amount=$b(1-\cos \Delta\theta)/\cos \Delta\theta \times m^2 + \Delta b \times m^2$.

Figure 8A:
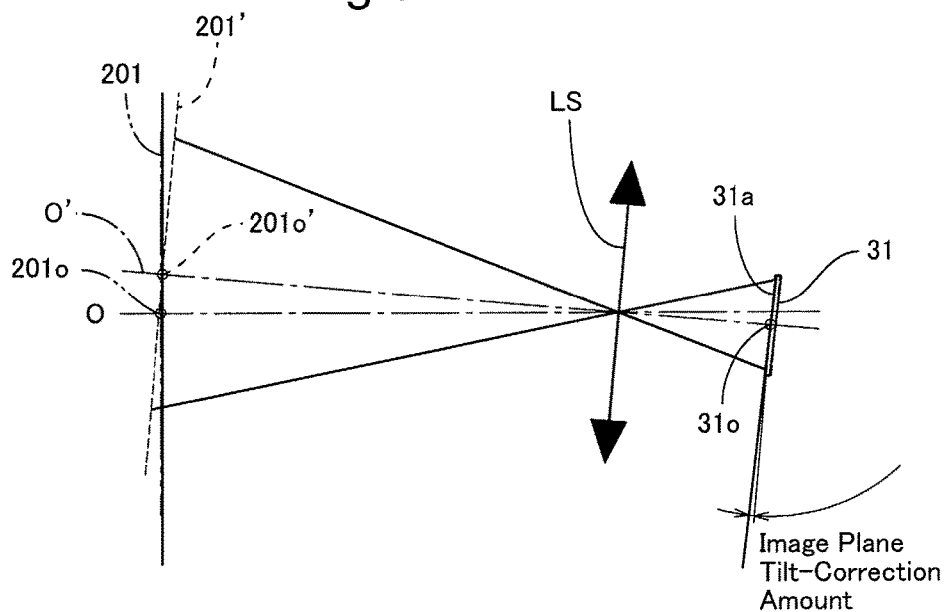
FIG. 8A is a diagram showing a state in which the tilt of the image sensor has been corrected with respect to the state shown in FIG. 7B.
Figure 8B:
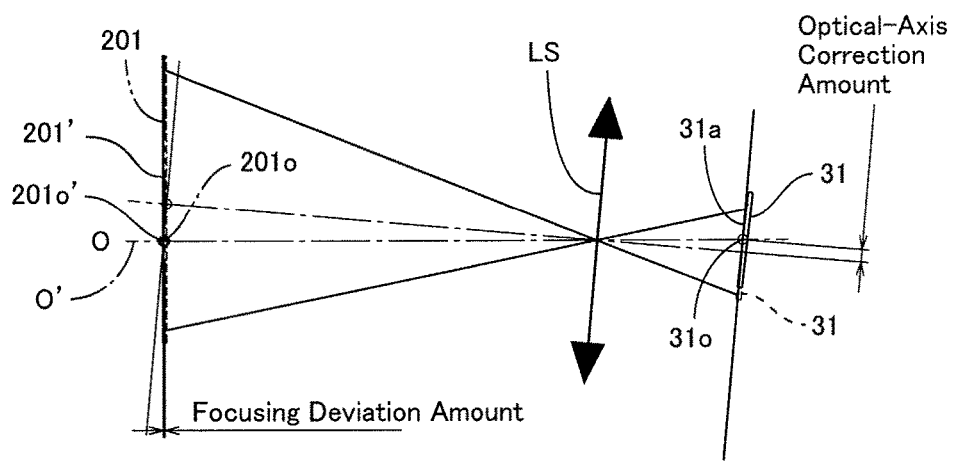
FIG. 8B is a diagram showing a state in which the optical axis has been corrected by moving the image sensor parallel to the principal plane from the state shown in FIG. 8A.

Although angular shake includes rotation (rolling/turning) about the Z-direction (first direction), rotation (tilting/swing-and-tilt) about the X-direction (second direction), rotation (panning) about the Y-direction (third direction), the embodiments for FIGS. 7B, 8A and 8B are described with respect to shake that occurs only as rotation (tilting/swing-and-tilt) about the X-direction (second direction).

[Shake Correction for Angular (Rotational) Shake]

FIG. 7B shows the digital camera 10 in a rotated (tilted) state about the X-direction, with respect to the initial state of FIG. 7A, caused by angular shake. In this state of angular shake, the principal plane LS, the image sensor 31 (imaging surface 31a), and the optical axis O (Z-axis) are inclined in a Z-Y plane, defined by the Z-direction and the Y-direction, by the angle $\Delta\theta$. A rotated object surface 201' is an imaginary object surface that is photographable in a focused state by the rotated digital camera 10. The point at which the object surface 201' and an extension of the optical axis O' intersect is the photographing area center 201o'.

[Rotational (Tilting) Correction of Object Surface]

The photographing area center 201o' of the object surface 201', subjected to angular shake, inclines from the initial photographing area center 201o of the object surface 201 by the inclination angle $\Delta\theta$ (angular shake amount). FIG. 8A shows a state where the imaging surface 31a (image sensor 31) is subject to image-surface tilt correction (tilt/rotation) so that the inclination of the object surface 201' becomes the same as the inclination of the object surface 201 before being tilted (due to angular shake). The amount of image-surface tilt correction of the imaging surface 31a is calculated by the following equation:

Image-surface tilt correction amount=$\Delta\theta \times m$.

The position of the corrected object surface 201', in which the imaging surface 31a has been rotated by the image-surface tilt correction amount, also include a minute amount of focusing error. Sometimes such focusing error can be ignored if the magnification m is extremely small. Focusing error that cannot be ignored is corrected by the below-described focusing correction.

[Optical Axis Correction]

Even if the imaging surface 31a is rotated (corrected) by the image-plane tilt-correction amount ($\Delta\theta \times m$), sometimes the optical axis O before correction and the optical axis O' after correction do not align, so that the photographing area center 201o before correction and the photographing area center 201o' after correction deviate from each other. Hence, in the present embodiment, the image sensor 31 is translated parallel to the principal plane LS to thereby carry out optical-axis correction (to correct the photographing-area center 201o').

FIG. 8B shows a state in which optical-axis correction has been carried out by translating the image sensor 31 parallel to the principal plane LS. The optical-axis correction amount (shift amount) of the image sensor 31 is calculated by the following equation:

Optical-axis correction amount=$a \times \tan \Delta\theta$.

Furthermore, even if an optical-axis correction (shift) is carried out on the image sensor 31 parallel to the principal plane LS, sometimes a focusing error occurs. A focusing shift amount for correcting a focusing error is calculated by the following equation:

Focusing shift amount=$b(1-\cos \Delta\theta)/\cos \Delta\theta$.

In the illustrated embodiment, the focusing direction is the direction of the optical axis O incident on the imaging surface 31a of the image sensor 31, and focusing is carried out in this direction of the optical axis O. Hence, the focusing shift amount is a shift amount in the direction of the optical axis O.

[Focusing Correction]

The focusing correction amount, which is a correction amount of the position of the image sensor 31 in the optical axis direction, is calculated, based on the focusing shift amount, by the following equation:

$$\text{Focusing correction amount} = \text{Focusing shift amount} \times m^2$$
$$= (b(1 - \cos\Delta\theta)/\cos\Delta\theta) \times m^2$$

Figure 9:
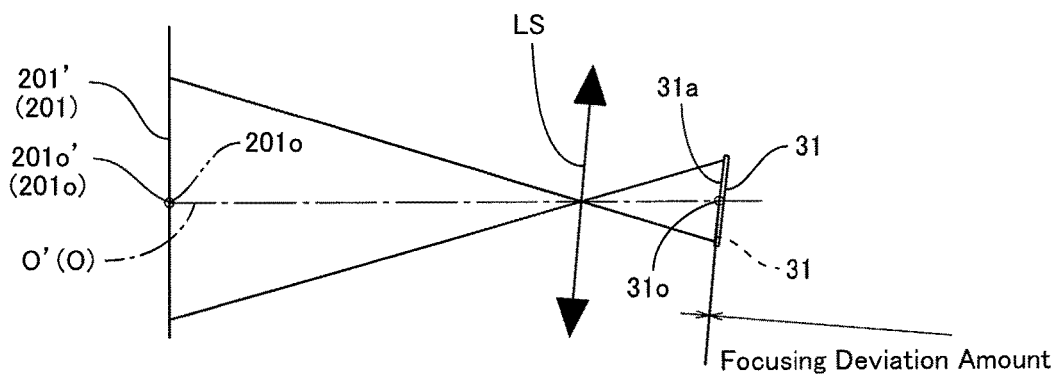
FIG. 9 is a diagram showing a focusing correction in which focusing state has been corrected by moving the image sensor in the optical axis direction from the state shown in FIG. 8B.

Focusing correction is carried out by translating the image sensor 31 in the focusing direction based on the calculated focusing correction amount (see FIG. 9). Due to this focusing correction, an in-focus state is achieved with respect to the image of the object surface on the imaging surface center 31o. In FIG. 9, the solid leading line indicates the image sensor 31 after focusing correction, and the broken leading line indicates the image sensor 31 before focusing correction.

As described above, by carrying out a tilt correction, a translation in the Y-direction and/or a translation in the focusing direction on the image sensor 31 (imaging surface 31a) via the stage apparatus 60, based on the image-surface tilt correction amount, the optical-axis correction amount and the focusing correction amount, respectively, the digital camera 10 can achieve an appropriate shake correction effect since the shake-corrected object surface 201' and the shake-corrected photographing area center 201o' become aligned with the object surface 201 and the photographing-area center 201o, as prior to shake (hand-shake) occurring.

[Shake Correction for X and Y Direction Shift Shake]

Figure 10A:
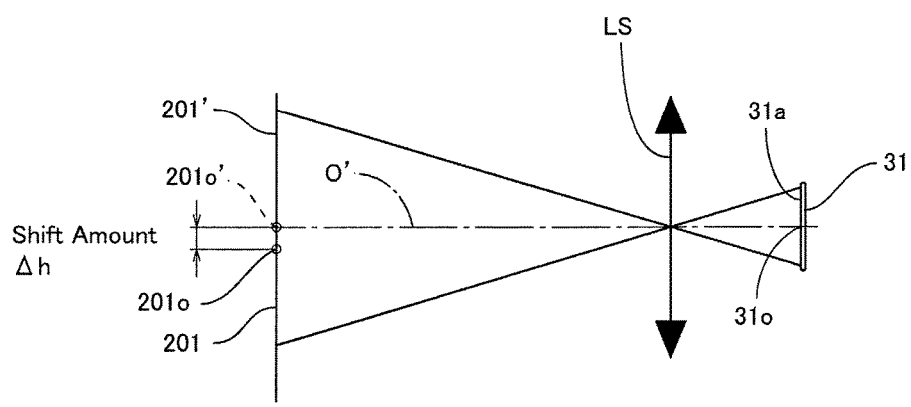
FIG. 10A is a diagram showing a shifted state caused by shift shake, with respect to the initial state of FIG. 7A, in a direction orthogonal to the optical axis.
Figure 10B:
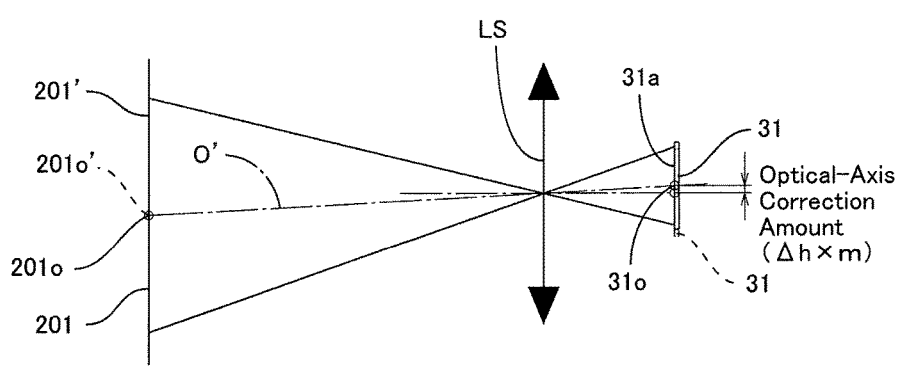
FIG. 10B is a diagram showing a state in which the optical axis has been corrected by moving the image sensor parallel to the principal plane from the shift-shake state shown in FIG. 10A.

FIGS. 10A and 10B show a shift correction that is applied to X and Y direction shift shake. Although it is possible for shake to occur in both the X-direction and in the Y-direction, in the illustrated embodiment, only the case in which shake occurs in the Y-direction is described. FIG. 10A shows a shifted state by a shift amount Δh caused by shift shake in the Y-direction with respect to the initial state of FIG. 7A. The photographing area center 201o', which has been subject to shift shake, is shifted from the photographing-area center 201o, before being subject to shift shake, in the Y-direction by the shift amount Δh.

In the illustrated embodiment, the position of the imaging surface center 31o is corrected by translating the image sensor 31 (imaging surface 31a) parallel to the principal plane LS. The optical axis correction amount is calculated by the following equation:

$$\text{Optical-axis correction amount} = \text{Shift shake amount} \times m$$
$$= \Delta h \times a/b$$
$$= \Delta h \times m$$

Optical-axis correction is carried out by translating the image sensor 31 in the Y-direction based on the calculated optical-axis correction amount (Δh×m) (see FIG. 10B). In FIG. 10B, the solid leading line indicates the image sensor 31 after optical-axis correction, and the broken leading line indicates the image sensor 31 before optical-axis correction.

Hence, according to this shake correction (optical-axis correction), an appropriate shake correction effect can be achieved without the imaging plane moving relative to the imaging surface 31a since the shake-corrected photographing-area center 201o' becomes aligned with the photographing-area center 201o, as prior to shake (hand-shake or vibrations, etc.) occurring.

[Shake Correction for Focusing Direction Shift Shake]

Figure 11A:
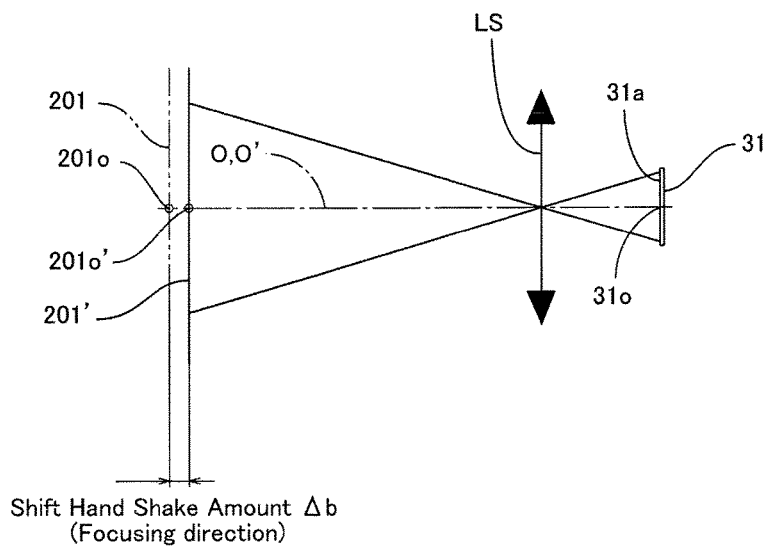
FIG. 11A is a diagram showing a shifted state (focusing-direction shift shake) in the optical direction caused by shift shake in the optical direction, with respect to the initial state of the FIG. 7A.
Figure 11B:
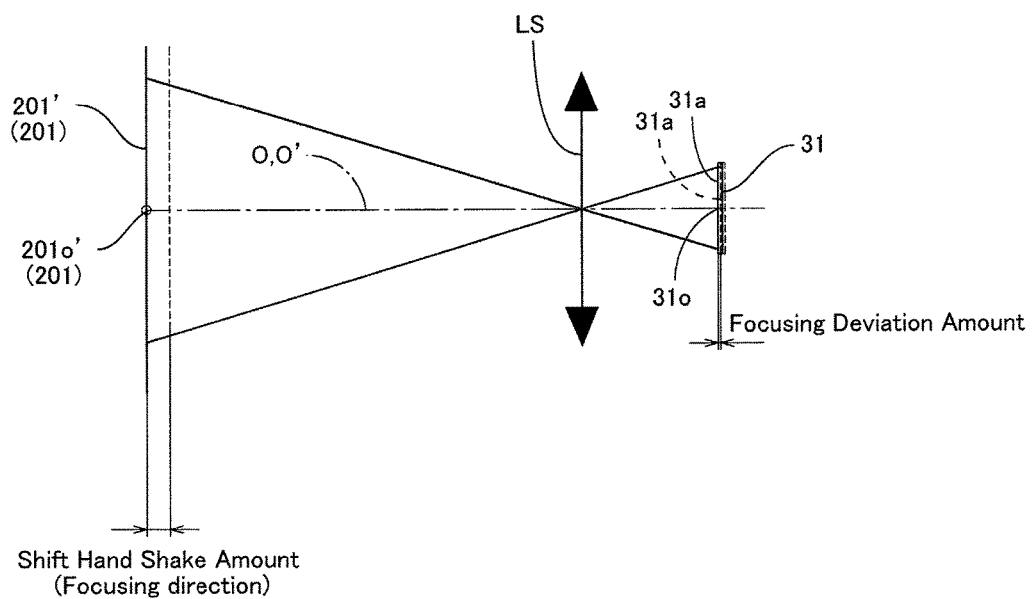
FIG. 11B is a diagram showing a focusing correction in which focusing state has been corrected by moving the image sensor in the optical axis direction (focusing direction) from the state shown in FIG. 11A.

FIGS. 11A and 11B show a shake correction for focusing direction shift shake. In this example, the digital camera 10, which was in an initial state, is subjected to shift shake in the direction of the optical axis. FIG. 11A shows the digital camera 10 in a focusing direction (optical axis O direction, Z-direction) shifted state, with respect to the initial state of the FIG. 7A. The object surface 201', subjected to shake, is shifted from the object surface 201 in the focusing direction by the shift amount Δb. Since the magnification is defined by "a/b" (image plane distance a/object distance b), the focusing correction amount Δa of the image sensor 31 (imaging surface 31a) is calculated by:

$$\Delta a = \Delta b \times m^2.$$

The imaging surface 31a translates in the focusing direction based on the calculated focusing correction amount Δa (Δb×m²) (see FIG. 11B). By carrying out this focusing correction, an appropriate shake correction effect can be achieved in which the shake-corrected object surface 201' coincides with the object surface 201, as prior to shake (hand-shake) occurring.

The above described embodiment relates to a shake-correction operation when the digital camera 10 is subjected to shake (hand-shake, vibrations, etc.) with the image sensor 31 at the initial state. In addition to the above-described embodiment, the present invention can also be applied to shake correction when the image sensor 31 is in a rotated state due to tilting, panning or rolling (turning). An example of a shake-correction operation, according the second embodiment, with the image sensor 31 in a tilted state will be described hereinbelow with reference to FIGS. 12 through 17.

Figure 12:
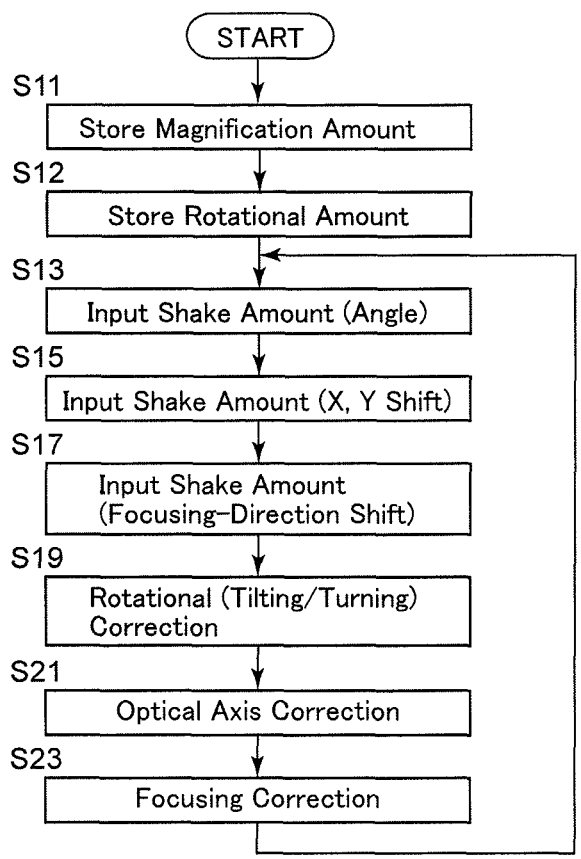
FIG. 12 is a flowchart of a shake correction operation of a shake-correction device of a photographing apparatus according to a second embodiment of the present invention.

FIG. 12 is a flowchart showing a shake correction operation, in a swing-and-tilt photographing state in which the image sensor 31 is tilted (rotated) about the X-direction, to correct angular shake, shift shake in the X and Y directions, and focusing direction shift shake. The difference between this second embodiment and the first embodiment of FIG. 6 is that in the first embodiment, the initial state is defined as the image sensor 31 being at an initial position that is orthogonal to the optical axis O (in which the initial position of the imaging surface 31a of the image sensor 31 is on a plane normal to (orthogonal to) the optical axis O), whereas, in the second embodiment, the initial state is defined as the image sensor 31 being at an inclined (tilted) position (with the imaging surface 31a of the image sensor 31 tilted (rotated) about the X-direction (second direction) or above the Y-direction (third direction)). Accordingly, in the second embodiment (unlike the first embodiment), in step S12, the rotational (tilt) amount (attitude and position data) of the image sensor 31 (the movable stage 61) is input from the position detection circuit 43 and stored in the embedded RAM 20a. The other process of the second embodiment are the same as those disclosed in the first embodiment, and the same processes have been designated with the same step numbers.

Details of the shake-correction operations of steps S19, S21 and S23 of FIG. 12 will be herein described with reference to FIGS. 13 through 17B. The second embodiment relates to a shake-correction operation in a swing-and-tilt photographing of an object surface 201 in which the object surface 201 at a finite distance is not parallel to the principal plane LS.

Figure 13:
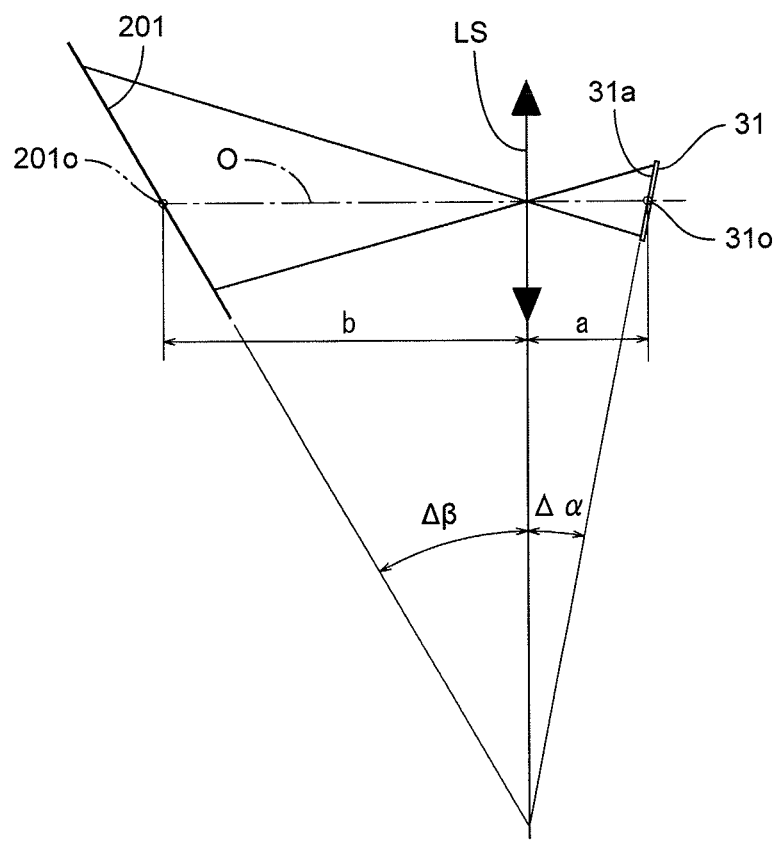
FIG. 13 is a diagram showing an object surface, a principal plane of a photographing lens of the photographing apparatus, and an imaging sensor of the photographing apparatus in a swing-and-tilt photographing state.

FIG. 13 shows the image sensor 31 in a tilted (rotated) state, in which an extension of the object surface 201 that is inclined (tilted/rotated) to the optical axis O, an extension of the principal plane LS and an extension of the imaging surface 31*a* all intersect at a single point. By tilting (rotating) the image sensor 31 in such a manner, in accordance with the Scheimpflug law, all parts of the image of the object surface 201 that is projected on the imaging surface 31*a* are in an in-focus state. The shake-correction operation with the image sensor 31 having a tilted state as its initial state will be described hereinbelow. In FIGS. 13 through 17B, the tilt angle defined by the extension of the principal plane LS and the extension of the object surface 201 constitutes an object surface tilt amount $\beta$, and the tilt angle defined by the extension of the principal plane LS and the extension of the imaging surface 31*a* constitutes an imaging surface tilt amount $\alpha$.

[Shake Correction for Angular (Rotational) Shake]

Figure 14A:
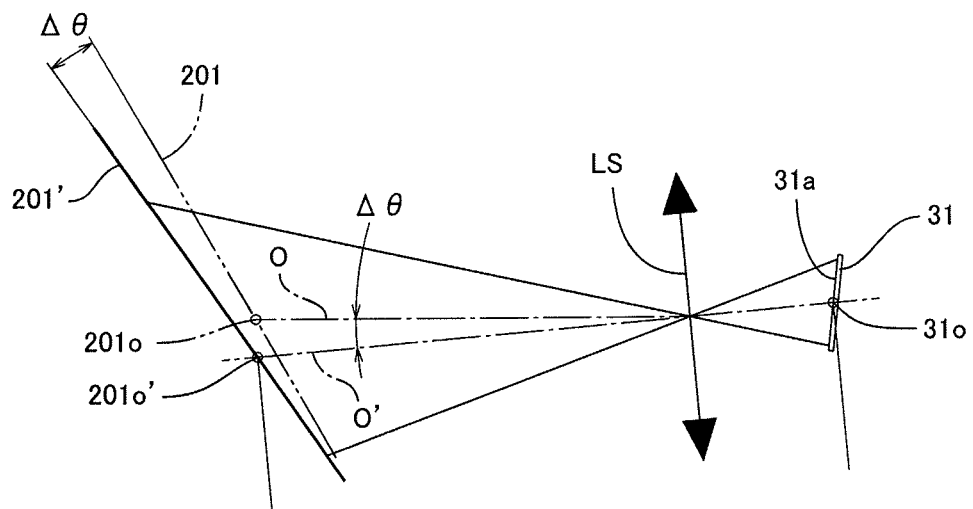
FIG. 14A is a diagram showing a rotated (tilted) state, with respect to the swing-and-tilt photographing state of FIG. 13, caused by angular shake.

FIG. 14A shows the digital camera 10 in a rotated (tilted) state about the X-direction, with respect to the initial swing-and-tilt photographing state of FIG. 13, caused by angular shake. Upon this angular shake occurring, the optical axis O (Z-axis) has rotated (tilted) in the Z-Y plane (defined by the Z-direction and the Y-direction) about the X-direction by an angle (angular shake amount) $\Delta\theta$.

[Rotational (Tilting) Correction of Object Surface]

Figure 14B:
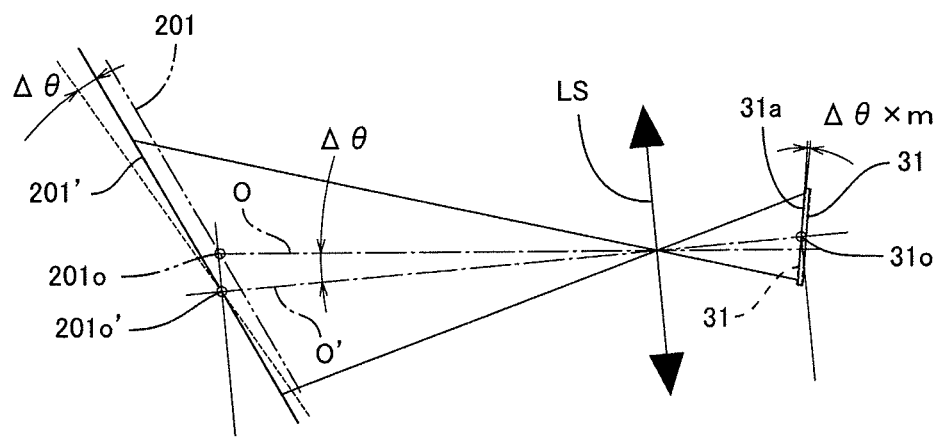
FIG. 14B is a diagram showing a state in which the tilt of the image sensor, caused by angular shake, with respect to the state shown in FIG. 14A has been tilt-corrected (rotationally corrected)

As shown in FIG. 14B, the imaging surface (imaging plane) 31*a* is rotated (tilted) so that the object surface 201' that is subjected to shake becomes parallel with the object surface 201, as prior to being subjected to shaking. The tilt amount $\Delta\beta$ of the object surface 201' and the tilt amount La have the following relationship:

$$\Delta\beta/\Delta\alpha=m$$

The image-surface tilt correction amount is a value equal to the tilt amount $\Delta\theta$ of the object surface 201' multiplied by the optical magnification m.

$$\text{Image-surface tilt correction amount} = \Delta\theta \times m$$

Hence, as shown in FIG. 14B, the imaging surface 31*a* is rotated (tilted) based on the image-surface tilt correction amount ($=\Delta\theta \times m$).

[Optical Axis Correction]

Next, in order to align the photographing area center 201*o'*, which is subjected to shaking, with the photographing area center 201*o* of the object surface 201, as prior to being subjected to shaking, an optical-axis correction is carried out by translating the image sensor 31 in a plane that is orthogonal to the optical axis O. The optical-axis correction amount is calculated by the following equation:

$$\text{Optical-axis correction amount} = a \times \tan \Delta\theta.$$

Figure 15:
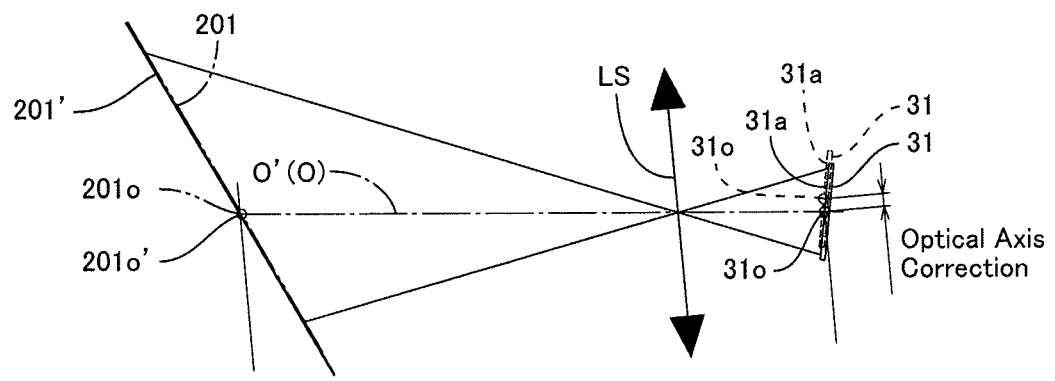
FIG. 15 is a diagram showing an optical-axis corrected state in which the image sensor is moved in a direction orthogonal to the optical axis from the state shown in FIG. 14B.

As shown in FIG. 15, the image sensor 31 is translated parallel (in the Y-direction) to the principal plane LS based on the optical-axis correction amount ($a \times \tan \Delta\theta$). In FIG. 15, the solid leading lines indicate the image sensor 31, the imaging surface 31*a* and the imaging surface center 31*o* after translation, and the broken leading lines indicate the image sensor 31, the imaging surface 31*a* and the imaging surface center 31*o* before translation.

Hence, by carrying out the above-described tilt correction of the image sensor 31 and the optical-axis correction of the image sensor 31, the object surface 201, before being subjected to shaking, and the object surface 201', which is subjected to shaking, coincide, thereby achieving an accurate shake-correction effect.

[Shake Correction when Subject to Shift Shake in X and/or Y Direction in Swing-and-Tilt Photographing State]

Figure 16A:
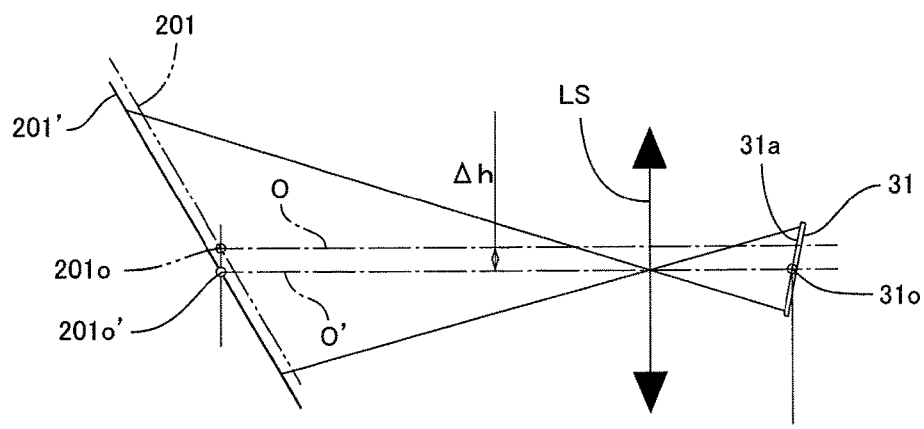
FIG. 16A is a diagram showing a shifted state caused by shift shake in a direction orthogonal to the optical axis from the initial swing-and-tilt photographing state shown in FIG. 13A.
Figure 16B:
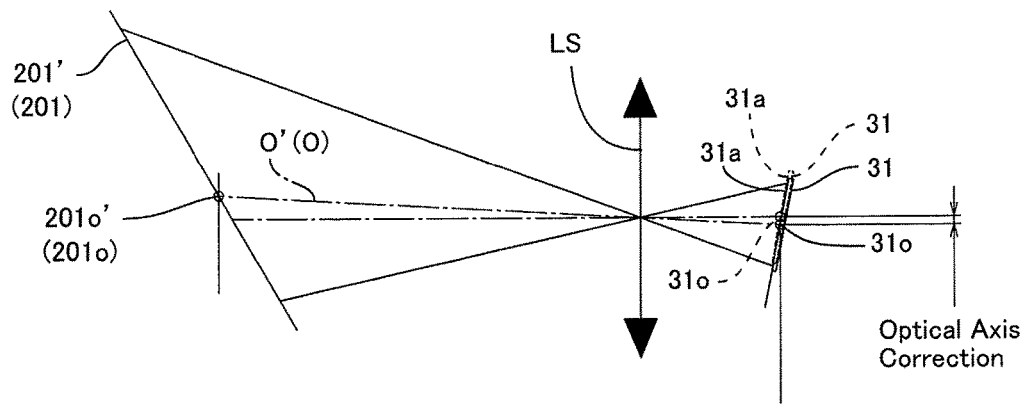
FIG. 16B is a diagram showing a state in which the optical axis has been corrected by moving the image sensor parallel to the principal plane from the state shown in FIG. 16A.

FIGS. 16A and 16B show shake correction of shift shake in the X and/or Y direction from the swing-and-tilt photographing state shown in FIG. 13. Although it is possible for shift shake to occur in both the X and Y directions, descriptions of the illustrated embodiment are directed to the case where shift shake only occurs in the Y direction. FIG. 16A shows a state in which the digital camera 10 is subjected to shift shake in the Y direction from the swing-and-tilt photographing state of FIG. 13. The photographing-area center 201*o'*, which is subjected to shaking, has shifted from the photographing-area center 201*o*, before being subjected to shaking, in the Y-direction by the shift amount $\Delta h$.

[Optical Axis Correction]

An optical axis correction is carried out to align the imaging surface center 31*o* of the imaging surface 31*a* with the photographing area center 201*o* of the object surface 201, as prior to being subjected to shaking. Accordingly, first an optical-axis correction amount (shift-shake correction amount) is obtained for translating (shifting) the image sensor 31 in a plane that is orthogonal to the optical axis O. The optical-axis correction amount is calculated by the following equation:

$$\text{Optical-axis correction amount} = \text{shift shake amount} \times \text{magnification}$$
$$= \Delta d \times m$$

Optical-axis correction is carried out by translating (shifting) the image sensor 31 in the Y-direction based on the calculated optical-axis correction amount ($\Delta d \times m$). FIG. 16B shows a state in which the optical-axis correction is carried out by translating the image sensor 31. According to this optical-axis correction, even if an X and/or Y direction shift-shake correction is carried out in a swing-and-tilt photographing state, an accurate shake-correction can be achieved in which the object surface 201, before being subjected to shaking, and the object surface 201', after being subjected to shaking, coincide; and the photographing-area center 201*o*, before being subjected to shaking, and the imaging surface center 31*o* align. In FIG. 16B, the solid leading line indicates the image sensor 31 before optical-axis correction, and the broken leading line indicates the image sensor 31 after optical-axis correction.

[Shake Correction when Subject to Shift Shake in Focusing Direction in Swing-and-Tilt Photographing State]

Figure 17A:
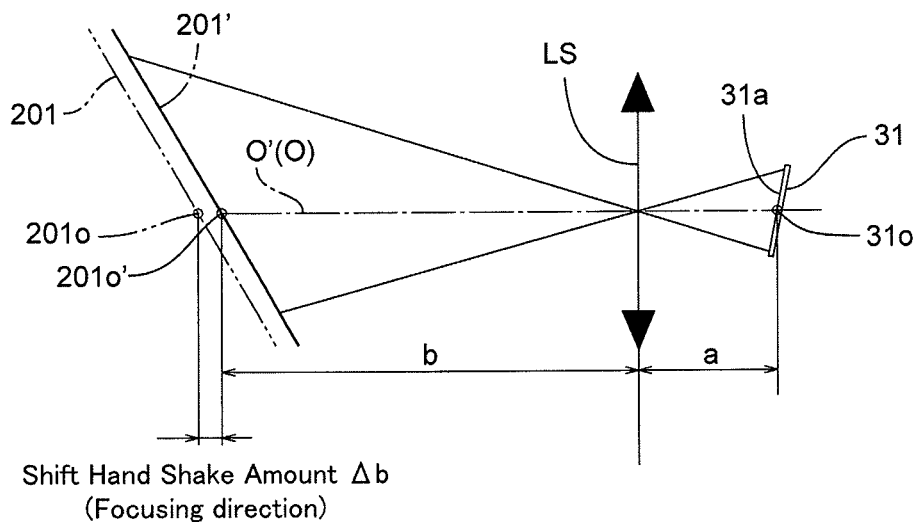
FIG. 17A is a diagram showing a shifted state (focusing-direction shift shake) in the optical direction caused by shift shake in the optical direction, from the initial swing-and-tilt photographing state shown in FIG. 13A.
Figure 17B:
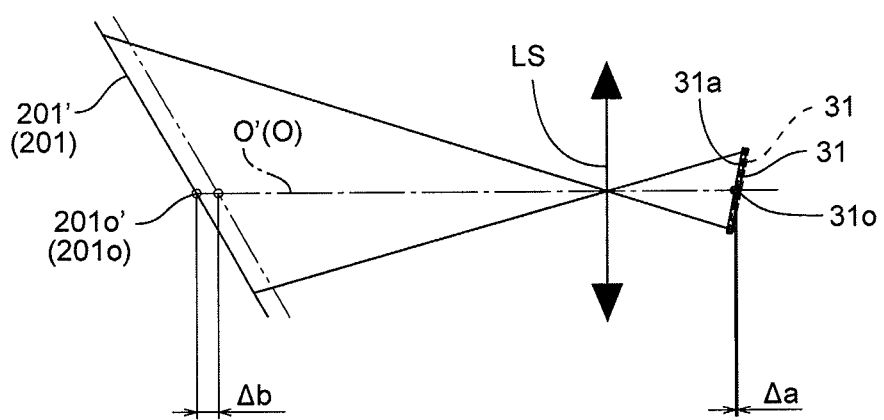
FIG. 17B is a diagram showing a focusing-corrected state in which the image sensor is translated in the optical axis direction (focusing direction) from the state shown in FIG. 17A.

FIGS. 17A and 17B show a shake correction for focusing direction shift shake. In this example, the digital camera 10, which was in swing-and-tilt photographing state, is subjected to shift shake in the focusing direction (optical axis O direction/Z-direction). FIG. 17A shows a state where a focusing-direction shift amount $\Delta b$, from the initial state shown in FIG. 13, after shift shake has occurred in the optical axis direction. The object surface 201', which has been subjected to shift shake, shifts in the optical axis direction by the focusing-direction shift amount $\Delta b$ from the object surface 201, as prior to being subjected to shaking. Since the magnification is defined by "a/b" (image plane distance a/object distance b), the focusing correction amount $\Delta a$ of the image sensor 31 (imaging surface 31*a*) is calculated by:

$$\Delta a = \Delta b \times m^2.$$

The image sensor 31 translates in the direction of the optical axis O based on the calculated focusing correction amount $\Delta a$ ($=\Delta b \times m^2$) (see FIG. 17B). In FIG. 17B, the solid leading line indicates the image sensor 31 after being translated, and the broken leading line indicates the image sensor 31 before being translated. By carrying out this shake-correction operation, an accurate shake correction can be achieved in which the shake-corrected object surface 201' and the photographing area center 201o' respectively coincide with the object surface 201 and the photographing area center 201o, as prior to being subjected to shaking.

According to the second embodiment, swing-and-tilt photography is possible in which the image sensor 31 is tilted, and even if shake (due to hand-shake/vibrations) occurs while the image sensor 31 is tilted, since the object image that is projected onto the imaging surface 31a of the image sensor 31 does not move relative thereto, the composition before shaking occurred is maintained, the image does not shake, and focal shift does not occur (an in-focus state is maintained). The present invention is not limited to the case where the initial state of the image sensor 31 is a tilted state, and can be applied to the case where the initial state is such that the image sensor 31 is panned, rolled (turned), or a combination of being tilted, panned and rolled, or the image sensor 31 is translated in the optical axis direction or in a direction orthogonal to the optical axis. In other words, according to the present invention, an appropriate shake correction can be carried out regardless of the attitude of the initial state of the image sensor 31.

The stage apparatus according to the present invention can be applied to various photographing apparatuses and optical apparatuses such as an interchangeable lens and a camera-integrated lens, in addition to a so-called mirrorless digital camera, an SLR (single lens reflex) digital camera, a compact digital camera, a digital video camera, drive recorder, action camera, a digital camera installed in a portable terminal (mobile phone, smartphone), etc.

Furthermore, the present invention can also be applied to a projector (image projector apparatus) which projects images (still/moving images) and data, etc., or a laser scanner. In the case where the present invention is applied to a projector, the projector can be provided at an approximate center of the movable stage 61 with an image-forming element (LCD panel) which allows projection light to be incident thereon from one side (the rear) of the LCD panel in the thickness direction of the movable stage 61 (the first direction/the Z-direction) and to emerge from the LCD panel to travel toward an projector optical system provided on the other side (the front) of the movable stage, or the projector can be provided at an approximate center of the movable stage 61 with a DMD (digital mirror device/digital micro mirror device) panel (projection panel) which reflects the incident projection light, which is incident thereon from a direction different from the first direction (the Z-direction), in the first direction (toward the projector optical system). Alternatively, a projector optical system can be mounted on the movable stage 61 instead of the image-forming element.

Figure 18:
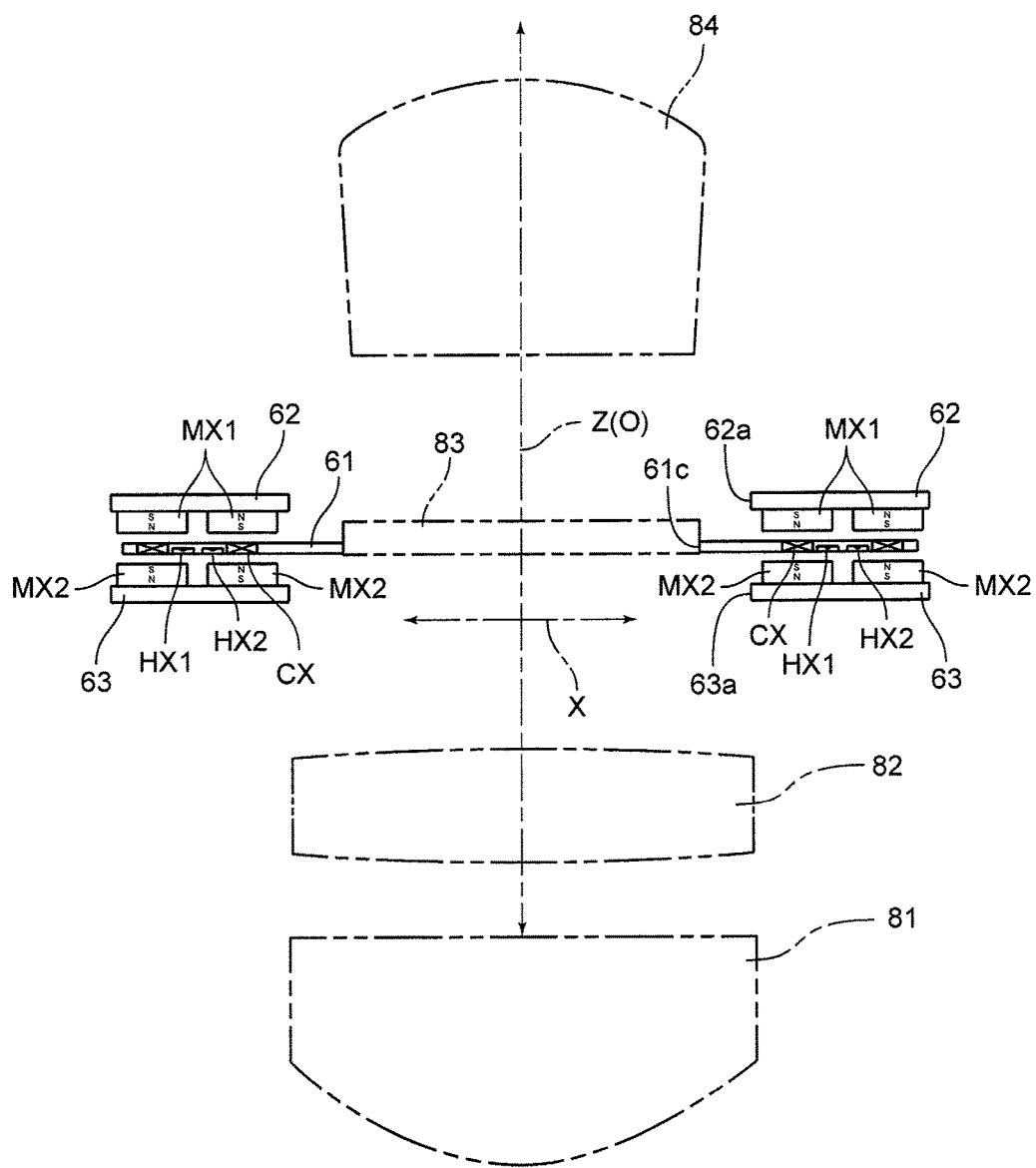
FIG. 18 is a cross-sectional view, corresponding to FIG. 2B, showing an embodiment of an image projector apparatus, according to the present invention.
Figure 19:
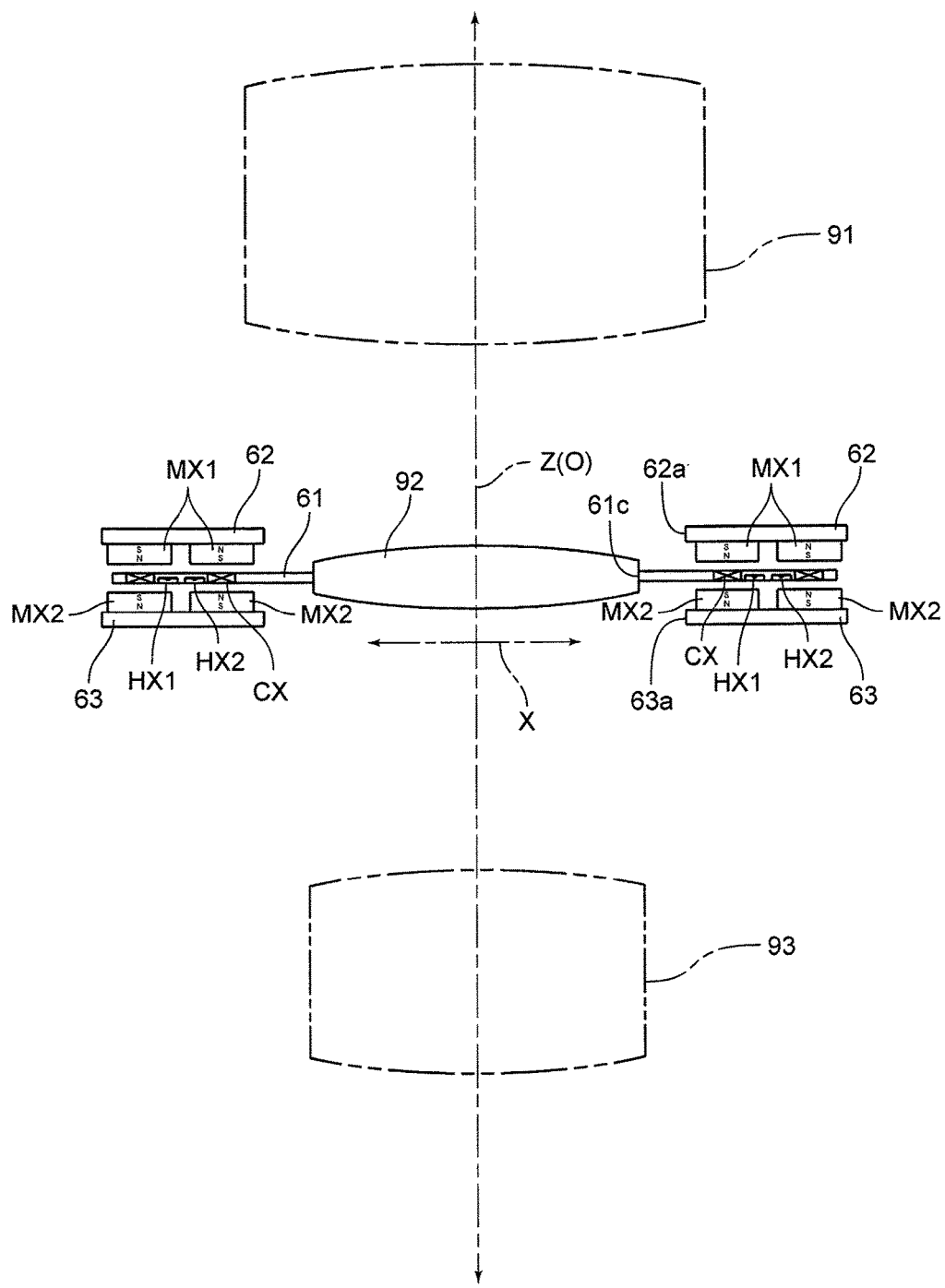
FIG. 19 is a cross-sectional view, corresponding to FIG. 2B, showing an embodiment of a hand-shake correction device (image stabilizer), according to the present invention.

FIG. 18 shows an embodiment of an image projector apparatus (projector) equipped with the stage apparatus 60 provided with the movable stage 61. The image projector apparatus is provided with a light source 81, an illumination optical system 82 which enables a uniform distribution of light emitted from the light source 81, an image-forming element 83 which forms an image upon receiving illumination light which emerges from the illumination optical system 82, the movable stage 61 on which the image-forming element 83 is mounted in an opening 61c, and a projector optical system 84, which projects the image formed by the image-forming element 83. Specific examples of the image-forming element 83 are an LCD panel or a DMD panel. The image-forming element 83 is installed onto a housing of the projector or the projector optical system 84 via the movable stage 61. The image-forming element 83 is positioned inside the projector so that a plane on which the image formed by the image-forming element 83 is formed is orthogonal to the optical axis O of the projector optical system 84 or the optical axis of any one of the lens elements of the projector optical system 84 in a state where the movable stage 61 is not driven (when the movable stage 61 is held at the initial position). The projecting direction and the projection position can be adjusted by changing the direction of the projection light which travels toward the projector optical system 84 after passing through the LCD panel or changing the direction of the projection light which is reflected by the DMD panel to travel toward the projector optical system 84, or adjusting the orientation of the projection image by translating the movable stage 61 in the Z-direction (optical axis O direction/first direction), X-direction (second direction) and/or the Y-direction (third direction) and/or rotating (turning) the movable stage 61 about the Z-direction (first direction) and/or rotating (tilting) the movable stage 61 about the X-direction (second direction) and/or the Y-direction (third direction), and the focus state can be adjusted by adjusting the distance between the projector optical system 84 and the LCD panel or the DMD panel.

Note that the projector may be provided with a focal detector for detecting a focal shift amount and/or a, e.g., a trapezoidal distortion detector for detecting trapezoidal distortion in the projected image; these detectors are used when focusing and when correcting trapezoidal distortion. In regard to trapezoidal distortion in particular, by providing a trapezoidal distortion detector, a trapezoidal distortion amount can be detected and automatically corrected by rotating the imaging plane with an image plane rotating device based on a focal shift amount.

Furthermore, the projector of the present embodiment can also be applied to digital signage technology. Specifically, the projector of the present embodiment can be utilized for shake correction in the case where the projector is installed in transportation such as inside a train or an automobile. Alternatively, the projector of the present embodiment can be utilized for shake correction in the case where the projector is installed in a movable robot. Furthermore, by installing the shake-correction device of the present invention in a hand-held miniature projector, hand-shake can be effectively corrected. It should be noted that the projector of the present embodiment can be generally installed in a photographing apparatus. In the case where a miniature projector is installed onto a photographing apparatus body, or a display thereof, photographing shake-correction may be carried out, during a photographing operation, by translating and/or rotating (tilting/turning) a movable stage that holds an image sensor or an optical element (lens group, etc.) of a photographing optical system; and a shake-correction may be carried out, during a projecting operation of a photographing image, by translating and/or rotating (tilting/turning) a movable stage that holds an image-forming element so that the projected image does not shake (relatively move with respect to the imaging surface). In the case where the shake-correction device of the present invention is installed a projector, although it is possible to achieve a higher resolution by a pixel shifting method in which the number of pixels that are displayed are increased by shifting the image-forming element by a half pixel or by one pixel, it is also possible to achieve a higher resolution by rotating the movable stage on which the image-forming element is mounted instead of, or in addition to, performing a pixel shifting method.

The stage apparatus of the present invention can also be applied to a lens barrel (e.g., a lens barrel disclosed in Japanese Unexamined Patent Publication No. 2015-4769) provided with an image-correction optical system in which one optical element of a photographing optical system is driven. For example, in the photographic lens 100, one or a plurality of optical elements of the photographing optical system can serve as a correction optical element (driven member). In this alternative embodiment shown in FIG. 10, a lens element (driven member) serving as a correction optical element 92 is provided between a first lens group 91 and a second lens group 93. The correction optical element 92 is mounted in an opening 61c formed in the approximate center of the movable stage 61. According to the present embodiment, hand-shake correction (image stabilization) and a special photographic effect such as swing-and-tilt photography by translating the movable stage 61 (correction optical element 92) in the Z-direction (optical axis O direction/first direction), the X-direction (second direction) and/or the Y-direction (third direction), and/or turning (rotating) the movable stage 61 (correction optical element 92) about the Z-direction (first direction), and/or tilting (rotating) the movable stage 61 (correction optical element 92) about the X-direction (second direction) and/or Y-direction (third direction). Furthermore, in the present embodiment, it is possible to carrying out a fine focusing adjustment by finely translating the movable stage 61 (correction optical element 92) in the Z-direction (optical axis O direction/first direction).

Furthermore, the digital camera 10, to which the present invention is applied, can carry out hand-shake correction (image stabilization) and/or a special photographic effect by a combined operation of a hand-shake correction device provided in the photographing lens 100 and a hand-shake correction device provided in the camera body 11.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A shake-correction device for a photographing apparatus, said photographing apparatus configured to photograph an object image that is projected onto an imaging surface by a photographing optical system, said shake-correction device comprising:
   a mover provided with a movable member, said mover configured to rotate at least one of the object image and the imaging surface in a rotational direction relative to a plane that is orthogonal to an optical axis of the photographing optical system, and configured to translate in a translation direction parallel to said plane that is orthogonal to the optical axis and translate in a translation direction parallel to the optical axis;
   a shake detector configured to detect an angular shake of said photographing apparatus in said rotational direction and detect a shift shake of said photographing apparatus in said translation directions;
   a movement controller configured to control movement of said mover so that the object image does not relatively move with respect to the imaging surface when said shake detector detects at least one of said angular shake and said shift shake; and
   a calculator configured to calculate a rotational correction amount, in accordance with said angular shake, and a shift correction amount, in accordance with said shift shake, for moving said mover so that said object image that is projected onto said image surface does not relatively move with respect to the imaging surface, wherein:
   when said shake detector detects shift shake in a direction orthogonal to the optical axis, said calculator calculates a shift amount in said direction orthogonal to the optical axis, caused by shift shake, and calculates an optical-axis direction movement amount and a rotational amount of said movable member in accordance with said shift shake, and
   said movement controller controls said mover to translate said movable member in the optical axis direction based on said optical-axis direction movement amount, and to rotate said movable member about a direction that is orthogonal to said optical axis based on said rotational amount.

2. The shake-correction device for a photographing apparatus according to claim 1, wherein said movable member comprises an image sensor configured to capture an image of said object image that is projected onto said imaging surface,
   wherein said mover is configured to at least one of:
   rotate said image sensor in a rotational direction relative to a plane that is orthogonal to an optical axis of the photographing optical system,
   translate said image sensor in a translation direction parallel to said plane that is orthogonal to the optical axis, and
   translate said image sensor in a translation direction parallel to the optical axis.

3. The shake-correction device for a photographing apparatus according to claim 1, wherein said movable member comprises an optical element of said photographing optical system,
   wherein said mover is configured to move said optical element so that said object image at least one of:
   rotates in a rotational direction relative to a plane that is orthogonal to an optical axis of the photographing optical system,
   translates in a translation direction parallel to said plane that is orthogonal to the optical axis, and
   translates in a translation direction parallel to the optical axis.

4. The shake-correction device for a photographing apparatus according to claim 1, wherein, when said shake detector detects angular shake, said calculator calculates a focusing shift amount, caused by said angular shake, and calculates a focusing correction amount in accordance with said focusing shift amount, and
   wherein said movement controller controls said mover to translate said movable member in a focusing direction based on said focusing correction amount.

5. The shake-correction device for a photographing apparatus according to claim 1, wherein, when said shake detector detects shift in the optical axis direction, said calculator calculates a shift amount in a focusing direction along the optical axis, and calculates a focusing correction amount in accordance with said shift amount, and
   wherein said movement controller controls said mover to translate said movable member in said focusing direction based on said focusing correction amount.

6. The shake-correction device for a photographing apparatus according to claim 1, wherein, when said shake detector detects an angular shake whereby the optical axis of said photographing optical system rotates relative to an initial position, said calculator calculates an image-surface tilt correction amount using the following formula:

$$\Delta\theta \times m, \text{ wherein}$$

Δθ designates the amount of said angular shake,
m designates an optical magnification of said photographing optical system, $$m = a/b,$$

"a" designates a distance between a principal plane of said photographing optical system and the imaging surface, and
"b" designates a distance between a principal plane of said photographing optical system and an object surface, and
said calculator calculates an optical-axis correction amount using the following formula:

$$\alpha \times \tan \Delta\theta, \text{ and}$$

wherein said movement controller controls said mover to rotate said image sensor based on the calculated said image-surface tilt correction amount and controls said mover to translate said image sensor in a direction orthogonal to the optical axis based on the calculated said optical-axis correction amount, thereby correcting said angular shake.

7. The shake-correction device for a photographing apparatus according to claim 6, wherein said calculator calculates an optical magnification of said photographing optical system based on the following formula:

$$m = a/b, \text{ wherein}$$

m designates the optical magnification of said photographing optical system,
"a" designates a distance between a principal plane of said photographing optical system and the imaging surface, and
"b" designates a distance between a principal plane of said photographing optical system and an object surface, and
wherein said calculate calculates at least one of said rotational correction amount and said shift correction amount based on said optical magnification.

8. A shake-correction method for a shake-correction device of a photographing apparatus, said photographing apparatus configured to photograph an object image that is projected onto an imaging surface by said photographing optical system, and said shake-correction device including a mover provided with a movable member, said mover configured to rotate at least one of the object image and the imaging surface in a rotational direction relative to a plane that is orthogonal to an optical axis of the photographing optical system and configured to translate in a translation direction parallel to said plane that is orthogonal to the optical axis and translate in a translation direction parallel to the optical axis; a shake detector; and a movement controller configured to control movement of said mover, said shake-correction method comprising:
  detecting, using said shake detector, an angular shake of said photographing apparatus in said rotational direction and detecting a shift shake of said photographing apparatus in said translation directions;
  controlling movement of said mover so that the object image does not relatively move with respect to the imaging surface based on at least one of said angular shake and said shift shake that is detected by said shake detector; and
  calculating a rotational correction amount, in accordance with said angular shake, and a shift correction amount, in accordance with said shift shake, for moving said mover so that said object image that is projected onto said image surface does not relatively move with respect to the imaging surface, wherein:
    when said shake detector detects shift shake in a direction orthogonal to the optical axis, calculating a shift amount in said direction orthogonal to the optical axis, caused by shift shake, and calculating an optical-axis direction movement amount and a rotational amount of the movable member in accordance with said shift shake, and
    controlling said mover to translate the movable member in the optical axis direction based on said optical-axis direction movement amount, and to rotate the movable member about a direction that is orthogonal to said optical axis based on the rotational amount.

9. A shake-correction device for an image projector apparatus, said image projector apparatus including an image-forming element and a projector optical system that is configured to project an image formed by said image-forming element, said shake-correction device comprising:
  a mover provided with a movable member, said mover configured to rotate at least one of the image-forming element and the projector optical system in a rotational direction relative to a plane that is orthogonal to an optical axis of the projector optical system, and configured to translate in a translation direction parallel to said plane that is orthogonal to the optical axis and translate in a translation direction parallel to the optical axis;
  a shake detector configured to detect an angular shake of said image projector apparatus in said rotational direction and detect a shift shake of said image projector apparatus in said translation directions; and
  a movement controller configured to control movement of said mover so that the projected image does not relatively move with respect to a projection surface when said shake detector detects at least one of said angular shake and said shift shake; and
  a calculator configured to calculate a rotational correction amount, in accordance with said angular shake, and a shift correction amount, in accordance with said shift shake, for moving said mover so that the projected image does not relatively move with respect to the projection surface, wherein:
    when said shake detector detects shift shake in a direction orthogonal to the optical axis, said calculator calculates a shift amount in said direction orthogonal to the optical axis, caused by shift shake, and calculates an optical-axis direction movement amount and a rotational amount of said movable member in accordance with said shift shake, and
    said movement controller controls said mover to translate said movable member in the optical axis direction based on said optical-axis direction movement amount, and to rotate said movable member about a direction that is orthogonal to said optical axis based on said rotational amount.

* * * * *